United States Patent Office
2,767,116
Patented Oct. 16, 1956

2,767,116

1,3-DISUBSTITUTED - 2 - STREPTOMYCYL-TETRA-HYDROIMIDAZOLE, ACID ADDITION SALTS THEREOF, AND THERAPEUTIC COMPOSITIONS CONTAINING SAME

Lee C. Cheney, Fayetteville, N. Y., assignor to Bristol Laboratories Inc., Syracuse, N. Y., a corporation of New York No Drawing. Application May 26, 1953,
Serial No. 357,620

14 Claims. (Cl. 167—65)

This invention relates to a new class of organic chemicals useful in therapeutics and in the manufacture of streptomycins and, more particularly, to new 1,3-substituted-2-streptomycyl-tetrahydroimidazoles and their non-toxic salts.

Throughout this specification and claims, the names "streptomycyl" and "hydroxystreptomycyl" are used to represent the radicals attached to the aldehyde group

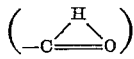

in the widely-known antibiotics streptomycin and hydroxystreptomycin. Thus, the antibiotic streptomycin is represented by the formula "Streptomycyl—CHO" or as "Strep.—CHO" (see U. S. Patent #2,607,770) rather than by the customary formula. An ordinary salt, such as the sulfate, is represented as Streptomycyl—CHO·1½H$_2$SO$_4$ or as "2 Streptomycyl—CHO·3H$_2$SO$_4$."

Up to the present time, there have not been available any active, non-toxic salts or forms or derivatives of streptomycin which are relatively insoluble in water. In chemical production, this means that elaborate processes, such as those using ion-exchange columns, are required to concentrate a solution of crude streptomycin. Final crystallization is a complex and expensive process using large amounts of organic solvents and generally also requiring formation of a calcium-chloride double salt before a satisfactory crystalline sulfate can be prepared. Illustrative processes are given by U. S. Patents #2,446,102, 2,541,420, and 2,578,840. Expensive toxic dyes are used by Regna; see U. S. Patents #2,555,762, 2,555,763, 2,560,889, 2,560,890, 2,555,761, 2,555,760.

A further disadvantage of known salts and derivatives of streptomycin and the free base is their instability under alkaline conditions, which irreversibly decompose and inactivate the streptomycin, forming the gamma-pyrone, maltol.

In therapeutic use, present water-soluble salts and derivatives of streptomycin and the free base are rapidly absorbed when administered by injection, e. g. intramuscularly, and do not give protracted blood levels. They are also absorbed very poorly upon oral administration. In the treatment of tuberculosis, prolonged high concentrations of streptomycin are not necessary and in addition increase the possibilities of neurotoxic reaction (Antibiotic Therapy, Welch and Lewis, Arundel Press, Washington, D. C., 1951, page 104). A repository preparation giving prolonged but not too high blood levels is therefore desired to overcome these objections and to spare the patient and physician the inconvenience and expense of numerous injections.

It is an object of the present invention to provide a new series of derivatives of streptomycin and hydroxystreptomycin and their acid addition salts, which are non-toxic, therapeutically effective, relatively insoluble in water, stable in aqueous alkali and easily regenerated by aqueous acid to the original soluble, active streptomycin.

It is a further object of the present invention to provide improved processes for the isolation and purification, as from inorganic and ash-forming impurities, of streptomycin from crude, aqueous solution.

It is a further object of the present invention to provide a new series of derivatives of streptomycin and hydroxystreptomycin and their non-toxic acid addition salts which upon parenteral administration in suitable media provide prolonged blood levels and prolonged therapeutic action.

It is an additional object of the present invention to provide a new series of derivatives of streptomycin and hydroxy-streptomycin and their non-toxic acid addition salts which are systemically absorbed and effective upon oral or buccal, e. g. sublingual, administration.

The objects of this invention have been achieved and there is now discovered, according to the present invention, the new series of compounds selected from the group consisting of compounds having the formula (a)

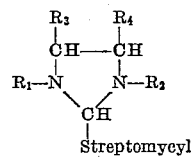

wherein R$_1$ and R$_2$ represent radicals selected from the group consisting of alkyl, cyclopentyl, cyclopentyl-lower alkyl, cyclohexyl cyclohexyl-lower alkyl, lower alkyl-cyclohexyl-lower alkyl, lower alkoxy-cyclohexyl-lower alkyl, lower alkyl-cyclohexyl, lower alkoxy-cyclohexyl, dehydroabietyl, pyridyl, lower alkyl pyridyl, thiophene-lower alkyl, lower alkyl-thiophene-lower alkyl, furan-lower alkyl, lower alkyl-furan-lower alkyl, quinolyl-lower alkyl, naphthyl, benzhydryl, piperonyl, thiazolyl, phenyl, lower alkyl-phenyl-lower alkyl, phenyl-lower alkyl, halophenyl-lower alkyl, nitrophenyl-lower alkyl, hydroxyphenyl-lower alkyl, H$_2$N-phenyl-lower alkyl, lower alkoxy-phenyl-lower alkyl, alkoxy-hydroxy-phenyl-lower alkyl, and di-lower alkyl-monohydroxy-phenyl-lower alkyl; R$_3$ and R$_4$ are members selected from the group consisting of hydrogen and methyl; and (b) acid addition salts thereof.

The products of the present invention are useful, non-toxic therapeutic agents in diseases of man and animals caused by streptomycin-sensitive tuberculosis bacteria and gram-negative bacteria and are useful as growth-stimulating supplements for animals and poultry, as in feeds, and for use to stimulate the growth of plants, such as radishes, oats and grass.

Further, as illustrated in detail below, the products of the present invention are of particular value in the commercial production of streptomycin because, by virtue of their very low solubility in water and other solvents, they provide improved means for isolation and purification of streptomycin from impurities, e. g. ash-forming impurities, streptomycin B.

The products of the present invention are further useful for their ability to provide prolonged, therapeutic blood-levels upon parenteral injection in suitable media in comparison with the non-toxic streptomycin salts of the prior art.

The products of the present invention are prepared by the reaction of hydroxystreptomycin free base, streptomycin free base or water-soluble acid addition salts thereof, and I prefer streptomycin sulfate, with an equimolar quantity, or more, of an N,N'-substituted-α,β-diaminoalkane, where there are two to four carbon atoms in the alkane carbon chain. Two examples are N,N'-dibenzylethylenediamine and N-p-methylbenzyl-N'-benzyl-1,2-diaminopropane. I prefer to conduct the reaction in water but can also use a mixture of water and a water-miscible organic solvent such as methanol or acetone when desired, e. g. to solubilize the amine. The reaction takes place at room temperature over a period varying from several hours to several days but can be accelerated by heating, e. g. to 50° C. for twenty minutes. The mixture needs to be maintained at a pH of about 7.0 or higher, since acid conditions reverse the reaction and regenerate the starting reagents. The product precipitates as a solid or as an oil which solidifies on seeding. The product may be purified of unreacted streptomycin reagent, i. e. sulfate, by slurrying with water.

Brief heating in aqueous acid regenerates the starting materials and often precipitates the diamine salt, e.g. N,N'-dibenzylethylenediamine hydrochloride. The purified streptomycin can be recovered in the usual ways, as by lyophilization or by crystallization of the sulfate by the addition of alcohol.

This invention also includes all acid addition salts for processing purposes and all non-toxic acid addition salts for therapeutic purposes, organic and inorganic examples of which include hydrochloric, sulfuric, sulfamic, tartaric, hydrobromic, hydriodic, glycolic, citric, maleic, phosphoric, succinic, acetic, benzoic, cinnamic, mandelic, malic, ascorbic, and the like. I prefer the sulfate.

When the imidazoles of the present invention are used for therapeutic purposes, they may be used in water with a suspending agent such as sodium carboxymethylcellulose, Spans, Tweens, lecithin or pectin or in injectable oils, e. g. peanut oil gelled with aluminum monostearate in a manner analogous to the art pertaining to insoluble salts of penicillin (see U. S. Patent 2,507,193). If desired, suspending or dispersing agents may be added to increase pharmaceutical elegance. As a suspending or dispersing agent, sodium carboxymethylcellulose has been found highly satisfactory but carboxymethylcellulose, methylcellulose, polyvinyl alcohol, polyvinylpyrrolidone, gum tragacanth, gelatin, pectin, sodium alginates, dextran, gum Karaya, and the like, are also useful. The amount of suspending agent will vary to a certain extent, but usually from about 0.2 to 5.0 percent, preferably from 0.5 to 2.5 percent, is employed and variations within these ranges may be made by any experienced chemist or pharmacist with regard to the intended use of the composition. Thus the concentration of polyvinylpyrrolidone may vary from 0.1% to 25%, with about 10% preferred. The concentration of dextran may vary from 0.1% to 20%, with about 10% preferred. The concentration of pectin may vary from 0.1% to 0.5%, with about 0.2% preferred. The concentration of gum tragacanth may vary from 0.5% to 2% with about 1% preferred; 5% sodium chloride may be added thereto.

It is to be understood that the words "suspending agent" and "dispersing agent" are used interchangeably to describe the additives such as sodium carboxymethylcellulose, lecithin, Spans and Tweens which improve the pharmaceutical elegance of these preparations, as by increasing ease of injection and ease of resuspension upon settling. Other suspending and dispersing agents include lecithin, Falba, cholesterol, Span 20, Span 40, Span 60, Span 80, the Tweens, Amerchols, sodium alginate, potassium alginate, ammonium alginate, calcium alginate, alginic acid, propylene glycol alginate, polyoxyalkylene derivatives of sorbitol fatty acid esters, urea and sodium p-aminobenzoate.

The composition is not limited to the exact ingredients previously described and to the exclusion of all others, since various other ingredients, while not necessary, may be added, if desired. For instance, a small amount of preservative, such as Phenol U. S. P., Cresol U. S. P., Methyl Paraben (methyl ester of p-hydroxybenzoic acid), Ethyl Paraben (ethyl ester of p-hydroxybenzoic acid), Butyl Paraben (butyl ester of p-hydroxybenzoic acid) or Propyl Paraben (propyl ester of p-hydroxybenzoic acid) may be employed. Other ingredients which improve blood levels, handling properties and stability may be added. Examples of such ingredients are lecithin, Falba, cholesterol, Span 20, Span 40, Span 60, Span 80, Tween 20, Tween 40, Tween 60, Tween 80, Tween 85, Amerchols, urea, and sodium para-amino-benzoate. The Spans are hexitol anhydride (hexitans and hexides derived from sorbitol) partial esters of common long-chain fatty acids (e. g. lauric, palmitic, stearic, oleic) and the Tweens are polyoxyalkylene derivatives of the Spans. On occasion it is advantageous to actually coat the particles of the drug, at least in part, with one of these agents, e. g. lecithin.

The diamine reagents of this invention are prepared by the usual synthetic methods. Thus by the reaction of ethylene dichloride with an appropriately substituted amine, substituted ethylene diamines are formed. Alternatively, ethylene diamine or its acid addition salts are reacted with formaldehyde and a suitably substituted compound containing an active hydrogen atom, such as aldehydes, ketones, thiophene, organic acids and the like, whereby N,N'-disubstituted ethylene diamines are obtained. In another method for the preparation of substituted ethylene diamines, a suitably substituted aldehyde or ketone is condensed with ethylene diamine to form the correspondingly substituted diimine. The diimine is hydrogenated by the usual methods, such as catalytic reduction and the like, to give the desired substituted ethylene diamine. Acid addition salts of the substituted ethylene diamines can be prepared by the methods of the art, as, for example, by inter-reaction of equivalent amounts of the substituted diamine base and a selected acid in inert solvent solution, followed by removal of the solvent.

Thus 1,2-bis-(phenylethylamino)ethane is prepared by mixing a solution of 54 g. (0.5 mole) of 1,2-dibromoethane in 250 cc. of ethanol and 242 g. (2 moles) of 2-phenylethylamine. The mixture is boiled for about an hour, made alkaline with potassium hydroxide and boiled for a further 10-minute period. The precipitated potassium bromide is removed, the alcohol is evaporated off and the residue, comprising 1,2-bis-(phenylethylamino)-ethane, is fractionally distilled under pressure. 1,2-bis-(phenylethylamino)ethane boils at about 240° C. at the pressure of 15 mm. of mercury.

Thus, in a 500 ml. three-necked flask, fitted with stirrer, condenser and thermometer, are mixed 42 g. (0.5 mole) of thiophene, 33 g. (0.25 mole) ethylenediamine dihydrochloride and 43 ml. of 36% aqueous formaldehyde. The mixture is stirred and heated to gradually raise the temperature. At 60° C. a vigorous reaction begins, heating is stopped and an ice-bath is applied to the flask. The internal temperature rises to about 73° C. and the reaction mixture solidifies. 200 ml. of 50% aqueous alcohol is added and stirred and the mixture is heated an additional 90 minutes. After cooling, the reaction product is filtered and washed with water. The white product is amorphous and is dissolved in 250 ml. hot water, cooled and made alkaline with 40% sodium hydroxide. The free base which separates is not very soluble in ether and is taken up in benzene, dried over sodium hydroxide and is obtained as a colorless, viscous oil on removing benzene in vacuo. The oil is converted to diacetate by dissolving in 200 ml. ethyl acetate and adding 12 ml. glacial acetic acid. The precipitated N,N'-bis(2-thenyl)-ethyl-enediamine diacetate is collected by filtration, washed with ethyl acetate and found to melt at about 84° C.

In essentially the same manner as above, one may also react an alkylene diamine such as ethylenediamine and an acid, as, for example, hydrochloric, sulfuric or formic acid, to form the di-acid salt together with half a mol. of formaldehyde, half a mol. of the following compounds may be reacted therewith to form the corresponding symmetrical di-substituted alkylene diamines: cyclohexanone, 2,3- and 4-methyl-cyclohexanone, 4-methoxy-cyclohexanone, cyclopentanone, 2-methyl-thiophene, isoquinoline, 3-methyl-isoquinoline and quinaldine.

Mixed N,N'-mono-substituted-ethylene diamines may be prepared in the ways known to the art. Thus, to prepare N-benzyl-N'-alpha-ethylbenzyl-ethylenediamine, dimethyl benzylaminoacetal (49 g., 0.25 mol.) and 1-phenyl-propylamine (34 g., 0.25 mol.) are mixed in a 500 ml. flask fitted with a reflux condenser with a drying tube. Formic acid (75 ml., 98–100%) is added all at once. A vigorous reaction ensues with darkening and evolution of heat and of carbon dioxide. When the initial vigorous reaction has subsided, the mixture is heated to reflux for two hours and excess formic acid is then removed by distillation under reduced pressure to leave a tarry residue to which is added 150 ml. of 6N HCl. After heating for reflux for one hour, cooling in an ice-bath and making alkaline by the addition of 40% aqueous sodium hydroxide, the supernatant layer is separated, diluted with 400 ml. ether and filtered to remove tar. The filtrate is dried over sodium hydroxide and treated with methanolic hydrochloric acid to precipitate N-benzyl-N'-alpha-ethylbenzyl-ethylenediamine dihydrochloride, which melts at about 305° C. after recrystallization from aqueous methanol.

Numerous other N,N'-bis-(mono-substituted) ethylenediamines may be prepared according to U. S. Patent #2,627,491. Formation of N-cyclohexyl-N'-ethyl-ethylenediamine is taught by this patent by reaction of acetaldehyde with N-cyclohexyl-ethylenediamine followed by catalytic hydrogenation; N-benzyl-N'-vanillylethylenediamine is prepared by reaction of N-benzyl-ethylenediamine with vanillin followed by reduction with formic acid. In the same patent are disclosed numerous N-mono-substituted-ethylenediamines (e. g. N-heptylethylenediamine) and a general process for their preparation by reaction of an aldehyde (e. g. heptaldehyde) with ethylenediamine diformate. These products can in turn be reacted as their diformates with aldehydes to give diamines of the formula $R_1$—NH—$CH_2$—$CH_2$—NH—$R_2$ where $R_1$ and $R_2$ differ.

Further understanding of the invention may be obtained by reference to the following examples which are illustrative only and are not the exclusive embodiment of the invention. I wish it to be understood that I do not desire to be limited to the exact details shown and described, for obvious modifications will occur to a person skilled in the art.

EXAMPLE 1

*1,3 - dibenzyl - 2 - streptomycyltetrahydroimidazole sulfate*

To a solution of 7.3 g. (0.01 mole) of streptomycin sulfate in 50 ml. of water was added 5.4 g. (0.025 mol.) of N,N'-dibenzylethylenediamine in 25 ml. of methanol. Addition of 45 ml. of methanol gave a clear solution. Heating on the steam bath at 45–50° C. for ten minutes caused precipitation of 1,3-dibenzyl-2-streptomycyltetrahydroimidazole sulfate as an oil which crystallized rapidly to a white solid. It was chilled, filtered and air-dried; weight—8.4 g.

The product was slurred for a few minutes with 50 ml. of water to insure removal of all streptomycin sulfate, collected by filtration and air-dried. Weight—7.2 g.; M. P.—243°–247° C. (decomposition, with previous browning); solubility—4980 u./ml. or about mgms./ml.; potency—512 u./mg. (83% of theory).

Analysis for $C_{37}H_{57}N_9O_{11} \cdot 1H_2SO_4 \cdot 2H_2O$: Calculated: C, 47.3; H, 6.77; N, 13.45; S, 3.42. Found: C, 47.4; H, 6.42; N, 12.3; S, 3.4.

A 1.5 g. sample of the imidazole was suspended in 25 ml. of 6N HCl and heated for three hours at 100° C. The mixture was filtered and the solid product recrystallized from water to give 0.5 g. of N,N'-dibenzylethylenediamine dihydrochloride. M. P.—305°–306° C. (d). An authentic sample gave M. P. 305°–307° C. (d). The filtrate contained active, regenerated streptomycin in solution.

EXAMPLE 2

The procedure of Example 1 was repeated with certain variations and the following, tabulated results.

| Conditions and Results | Experiment No. | | |
|---|---|---|---|
| | Run 1 | Run 2 | Run 3 |
| Moles of Streptomycin Sulfate | 0.005 | 0.01 | 0.01. |
| Potency of Streptomycin Sulfate | 769 u./mgm | 769 u./mgm | 769 u./mgm. |
| Moles of Amine | 0.027 | 0.011 | 0.0225. |
| Grams of Amine | 6.5 | 2.6 | 5.4. |
| Mls. $H_2O$ | 75 | 50 | 50. |
| Mls. MeOH | 95 | 75 | 70. |
| pH | 8 | 5 | 7.2.[1] |
| Yield (grams) | 3.6 | 5.2 | |
| M. P. | 245-255° C. (d.) | 249-252° C. (d.) | 243-247° C. (d.). |
| Potency (bio-assay)[2] | 630 u./mgm | 500 u./mgm | 512 u./mgm. |
| Solubility in water of Product[3] | | 2092 u./ml | 4560 u./ml. |
| Reaction Time | Room temp. for a few hours. | Room temp. for 3 days. | 45°–50° C. for 10 minutes; Room temp. 24 hours. |

[1] Product slurried with 50 ml. water to remove unreacted streptomycin sulfate, collected by filtration, air-dried and then weighed and assayed.

[2] The potency of the product was determined on suspensions by bio-assay (*subtilis* and *coli*) due to its insolubility in water, methanol, butanol, ketones, acetonitrile, nitromethane, chloroform, dimethylformamide and amyl acetate and acetone. The suspensions contained 10 mgms. of finely-ground product per ml. water.

[3] The solubility of the product was determined by shaking at least 0.1 g. of finely ground material in 10 ml. water for hours, filtering the solution which contains much undissolved product and assaying the filtrate (*subtilis* and *coli*).

EXAMPLE 3

*1,3 - di(β - phenethyl) - 2 - streptomycyltetrahydroimidazole sulfate*

A solution of 2.7 g. (0.01 mole) of N,N'-di(β-phenethyl)-ethylenediamine in 20 ml. of methanol was added to a solution of 7.3 g. (0.01 mole) of streptomycin sulfate in 50 ml. of water. Portionwise addition of 35 ml. of methanol gave a clear solution. After standing for 24 hours at 5°–10° C. the precipitated, solid 1,3-di(β-phenethyl)-2-streptomycyltetrahydroimidazole sulfate was collected by suction. It was hygroscopic and was dried in vacuo over $P_2O_5$. Weight—3.0 g. (30%) of glassy solid. M. P.—195°–205° C. (d. browns at 160° C.); solubility in water—4400 u./ml.; potency—396 u./mg. (67.5% of theory).

Analysis for $C_{39}H_{61}N_9O_{11} \cdot 1\frac{1}{2}H_2SO_4$: Calculated: C, 47.9; H, 6.6. Found: C, 48.1; H, 6.9.

EXAMPLE 4

*1,3 - di(dehydroabietyl) - 2 - streptomycyltetrahydroimidazole sulfate*

A solution of 3.0 g. (0.005 mole) of N,N'-di(dehydroabietyl)-ethylenediamine in 30 ml. of methanol and 10 ml. of acetone was added to a solution of 3.6 g. (0.005 mole) of streptomycin sulfate in 25 ml. of water. A flocculent solid precipitated at once; this product became slightly gummy, but was collected by suction after three days at 5°–10° C. and dried in air to give 6.0 g. (92.5%) of yellow, solid 1,3-di(dehydroabietyl)-2-streptomycyltetrahydroimidazole sulfate. This was slurried in boiling water for a few minutes, cooled and collected by suction. Recovery—5.0 g.; potency—185 u./mg. (43% of theory); solubility in water—352 u./ml.

EXAMPLE 5

*1,3 - dicyclohexyl - 2 - streptomycyltetrahydroimidazole sulfate*

A solution of 2.4 grams (0.011 moles) of N,N'-dicyclohexylethylenediamine dissolved in the minimum amount of methanol is added to 7.3 g. (0.01 moles) streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-dicyclohexyl-2-streptomycyltetrahydroimidazole sulfate, precipitates either upon cooling or upon the addition of water and is collected by filtration or by decantation.

A 1.5 g. sample of this imidazole is heated for three hours at 100° C. in 25 ml. of 6N HCl to regenerate the amine hydrochloride and soluble, active streptomycin.

EXAMPLE 6

*1,3 - di - tert. - butyl - 2 - streptomycyltetrahydroimidazole sulfate*

A solution of 1.8 grams (about 0.01 moles) of N,N'-di-tert.-butylethylenediamine dissolved in the minimum amount of methanol is added to 7.3 g. (0.01 mole) streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-di-tert.-butyl-2-streptomycyltetrahydroimidazole sulfate, precipitates either upon cooling or upon the addition of water and is collected by filtration or by decantation.

A. 1.5 gram sample of this imidazole is heated for three hours at 100° C. in 25 ml. of 6N HCl to regenerate the amine hydrochloride and soluble, active streptomycin.

EXAMPLE 7

*1,3 - di - (1,1,3,3-tetramethyl-n-butyl)-2-streptomyclytetrahydroimidazole sulfate*

A solution of 2.8 grams (0.01 moles) of N,N'-di-(1,1,3,3-tetramethyl-n-butyl) - ethylenediamine dissolved in the minimum amount of methanol is added to 7.3 g. (0.01 mole) streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-di-(1,1,3,3-tetra methyl - n - butyl) - 2 - streptomycyltetrahydroimidazole sulfate, precipitates either upon cooling or upon the addition of water and is collected by filtration or by decantation.

A 1.5 gram sample of this imidazole is heated for three hours at 100° C. in 25 ml. of 6N HCl to regenerate the amine hydrochloride and soluble, active streptomycin.

EXAMPLE 8

*1,3-di-n-heptyl-2-streptomycyltetrahydroimidazole sulfate*

A solution of 2.7 grams (about 0.01 moles) of N,N'-di-n-heptyl-ethylenediamine dissolved in the minimum amount of methanol is added to 7.3 g. (0.01 mole) streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-di-n-heptyl-2-streptomycyltetrahydroimidazole sulfate, precipitates either upon cooling or upon the addition of water and is collected by filtration or by decantation.

A 1.5 grams sample of this imidazole is heated for three hours at 100° C. in 25 ml. of 6N HCl to regenerate the amine hydrochloride and soluble, active streptomycin.

EXAMPLE 9

*1,3-di-benzhydryl-2-streptomycyltetrahydroimidazole sulfate*

A solution of 4.3 grams (0.01 moles) of N,N'-dibenzhydrylethylenediamine dissolved in the minimum amount of methanol is added to 7.3 g. (0.01 mole) streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-di-benzhydryl-2 - streptomycyltetrahydroimidazole sulfate, precipitates either upon cooling or upon the addition of water and is collected by filtration or by decantation.

A 1.5 gram sample of this imidazole is heated for three hours at 100° C. in 25 ml. of 6N HCl to regenerate the amine hydrochloride and soluble, active streptomycin.

EXAMPLE 10

*1,3-diphenyl-2-streptomycyltetrahydroimidazole sulfate*

A solution of 2.3 grams (0.01 mole) of N,N'-diphenylethylenediamine dissolved in the minimum amount of methanol is added to 7.3 g. (0.01 mole) streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-diphenyl-2-streptomycyltetrahydroimidazole sulfate, precipitates either upon cooling or upon the addition of water and is collected by filtration or by decantation.

A 1.5 gram sample of this imidazole is heated for three hours at 100° C. in 25 ml. of 6N HCl to regenerate the amine hydrochloride and soluble, active streptomycin.

EXAMPLE 11

*N,N'-bis-dehydroabietylethylenediamine*

Dehydroabietylamine (190 grams), ethylene bromide (59.3 g.) and potassium carbonate (92 g.) were mixed with 2.5 liters toluene in a flask equipped with a stirrer and refluxed overnight. The toluene solution was filtered, washed with dilute sodium hydroxide and then two liters of water and the toluene removed by distillation to leave 175.3 g. crude product, N,N'-bis-dehydroabietylethylenediamine which was purified by distilling off the impurities, particularly dehydroabietylamine, up to 275° C./1 mm., at which point the product begins to distill.

EXAMPLE 12

*N,N'-bis-(t-octyl)-ethylenediamine*

A mixture of 650 grams (5.0 moles) of t-octylamine (Rohm and Haas, B. P. 137–142° C. at 760 mm., also called 1-amino-1,1,3,3-tetramethyl-n-butane) and 50 ml. of water was heated under reflux with stirring during the dropwise addition of 188 grams (1.0 mole) of ethylene dibromide, and heating was continued for an additional 8 hours. While still warm, the mixture was treated with 300 grams of 50% sodium hydroxide; the organic layer was separated and washed with dilute alkali and water. After drying, the material was fractionally distilled to yield about 260 grams (about 92% of theoretical) of N,N'-bis-(t-octyl)-ethylenediamine boiling at 120° C. at a pressure of 0.5 mm. Hg.

EXAMPLE 13

N,N'-bis-(cylohexylmethyl)ethylenediamine

Commercially available 1,2,5,6-tetrahydrobenzaldehyde 30.0 grams; 0.272 mole) in 50 ml. methanol is mixed with 7.5 grams (0.125 mole) of anhydrous ethylenediamine. Appreciable heat is evolved and the solution turns yellow. Raney nickel catalyst (40.0 grams wet weight) washed successively with water and methanol is added and the mixture is hydrogenated with shaking in an atmosphere of hydrogen at about 50 pounds per square inch gauge at about 60° C. After the absorption of about two moles of hydrogen for each mole of tetrahydrobenzaldehyde used, the catalyst is removed by filtration and the solution is acidified with concentrated hydrochloric acid. White crystalline N,N'-bis(cyclohexylmethyl)ethylenediamine dihydrochloride precipitates and is collected. Upon recrystallization from water, this product melts at about 318°–319° C. with decomposition.

Analysis: Calculated for $C_{16}H_{32}N_2 \cdot 2HCl$: Calculated: C, 59.1; H, 10.5. Found: C, 59.3; H, 10.2.

N,N'-bis-(cyclohexylmethyl)ethylenediamine dihydrochloride (3.2 grams, 0.01 mole) prepared as above, is suspended in water and neutralized with 50% sodium hydroxide. The liberated free base, N,N'-bis-(cyclohexylmethyl)-ethylenediamine, is extracted into ether. The combined ethereal extracts are washed with water and saturated sodium chloride solution and filtered through anhydrous sodium sulfate. The solvent ether is removed by distillation, leaving the free base as a colorless oil.

EXAMPLE 14

N,N'-bis-(3,5-dimethyl-2-hydroxybenzyl)-ethylenediamine

Anhydrous ethylenediamine (30.0 g., 0.5 mole) is added to a solution of 4-hydroxy-1,3-dimethylbenzene (122.2 g., 1.0 mole) in 250 ml. methanol. Formalin U. S. P. (75 ml., 1.0 mole) is added dropwise while the mixture is stirred and refluxed for nineteen hours. After adding 200 ml. of concentrated hydrochloric acid, followed by cooling and the addition of toluene to facilitate handling, the white, crystalline dihydrochloride of N,N'-bis-(3,5-dimethyl-2-hydroxybenzyl)-ethylenediamine precipitates and is collected by filtration.

After two recrystallizations from a mixture prepared from equal volumes of water and methanol to which about one-twentieth part of concentrated hydrochloric acid has been added, the product melts at about 225.5°–228.5° C.

Analysis for $C_{20}H_{30}Cl_2N_2O_2$: Calculated: C, 59.84; H, 7.53. Found: C, 60.0; H, 7.61.

The free base is liberated from the dihydrochloride with alkali in the usual manner.

EXAMPLE 15

N,N'-bis(alpha-methylbenzyl)-ethylenediamine

Alpha-methylbenzylamine (48.4 grams, 0.4 moles) is placed in a three-necked flask fitted with stirrer, condenser and dropping funnel and arranged for heating with an electric mantle. Ethylene dibromide (18.8 grams, 0.1 mole) is dropped into the heated amine over a period of two hours. After all of the bromide is added, 8 ml. of water is added and the reaction mixture is refluxed for an additional six hours. The mixture is allowed to cool to room temperature and is then neutralized by the addition of ten grams of sodium hydroxide in 25 ml. of water. The organic layer is separated, dried and distilled under reduced pressure to give N,N'-bis(alpha-methylbenzyl)-ethylenediamine, boiling about 176°–185° C. at 4 mm. of mercury pressure.

EXAMPLE 16

1,3-dipiperonyl-2-streptomycyl-tetrahydroimidazole sulfate

A solution of 3.3 grams of N,N'-dipiperonylethylenediamine (M. P. about 145° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Lyophilization of the reaction mixture leaves solid 1,3-di-(piperonyl)-2-streptomycyl-tetrahydroimidazole sulfate.

A 1.5 g. sample of this imidazole is heated for three hours at 100° C. in 25 ml. of 6N HCl to regenerate the amine hydrochloride and soluble active streptomycin.

EXAMPLE 17

1,3-di(furfuryl)-2-streptomycyl-tetrahydroimidazole sulfate

A solution of 2.2 grams of N,N'-difurfurylethylenediamine (M. P. about 135°/0.15 mm.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The alcohol is removed by distillation in vacuo below 50° C. and replaced by water; upon cooling the product, 1,3-di(furfuryl)-2-streptomycyl-tetrahydroimidazole sulfate, precipitates as a gum which gradually solidifies upon seeding.

A 1.5 g. sample of this imidazole is heated for three hours at 100° C. in 25 ml. of 6N HCl to regenerate the amine hydrochloride and soluble, active streptomycin.

EXAMPLE 18

1,3-bis-(2-heytyl)-2-streptomycyl-tetrahydroimidazole sulfate

A solution of 2.6 grams of N,N'-bis-(2-heptyl)-ethylenediamine (B. P. about 126° C./2 mm.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Upon cooling and the careful addition of water, the solid 1,3-bis-(2-heptyl)-2-streptomycyl-tetrahydroimidazole sulfate separates and is collected by filtration.

A 1.5 gram sample of this imidazole is heated for three hours at 100° C. in 25 ml. of 6N HCl to regenerate the amine hydrochloride and soluble, active streptomycin.

EXAMPLE 19

1,3-bis(gamma-phenylpropyl)-2-streptomycyl-tetrahydroimidazole sulfate

A solution of 3.0 grams of N,N'-bis(gamma-phenylpropyl)-ethylenediamine (B. P. about 160° C./—.25 mm.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. After cooling, the crystalline product, 1,3-bis(gamma-phenylpropyl)-2-streptomycyl-tetrahydroimidazole sulfate, is filtered off and dried.

A 1.5 gram sample of this imidazole is heated for three hours at 100° C. in 25 ml. of 6N HCl to regenerate the amine hydrochloride and soluble, active streptomycin.

EXAMPLE 20

*1,3-di(cyclohexyl)-2-streptomycyl-tetrahydroimidazole sulfate*

A solution of 2.2 grams of N,N'-dicyclohexylethylenediamine (M. P. of hydrate about 82° C.; dihydrochloride melts about 315° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-di(cyclohexyl)-2-streptomycyl-tetrahydroimidazole sulfate, is recovered as a nearly white solid by removing the solvents by distillation in vacuo.

A 1.5 gram sample of this imidazole is heated for three hours at 100° C. in 25 ml. of 6N HCl to regenerate the amine hydrochloride and soluble, active streptomycin.

EXAMPLE 21

*1,3-bis-(4-methyl-2-pentyl)-2-streptomycyl-tetrahydroimidazole sulfate*

A solution of 2.3 grams of N,N'-bis-(4-methyl-2-pentyl)-ethylenediamine (B. P. about 96° C./1 mm.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The solid product, 1,3-bis-(4-methyl-2-pentyl)-2-streptomycyl-tetrahydroimidazole sulfate, precipitates upon seeding and the addition of water and is collected by filtration and dried.

A 1.5 gram sample of this imidazole is heated for three hours at 100° C. in 25 ml. of 6N HCl to regenerate the amine hydrochloride and soluble, active streptomycin.

EXAMPLE 22

*1,3-bis-(3,5,5-trimethylhexyl)-2-streptomycyl-tetrahydroimidazole sulfate*

A solution of 3.1 grams of N,N'-bis-(3,5,5-trimethylhexyl)-ethylenediamine (B. P. about 150°/1.2 mm.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(3,5,5-trimethylhexyl)-2-streptomycyl-tetrahydroimidazole sulfate, is recovered as a solid by lyophilization.

A 1.5 gram sample of this imidazole is heated for three hours at 100° C. in 25 ml. of 6N HCl to regenerate the amine hydrochloride and soluble, active streptomycin.

EXAMPLE 23

*1,3-bis-(p-chlorobenzyl)-2-streptomycyl-tetrahydroimidazole sulfate*

A solution of 3.1 grams of N,N'-bis-(p-chlorobenzyl)-ethylenediamine (diacetate melts about 126° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The precipitate of 1,3-bis-(p-chlorobenzyl)-2-streptomycyl-tetrahydroimidazole sulfate which separates upon the addition of water is collected by filtration and dried.

A 1.5 gram sample of this imidazole is heated for three hours at 100° C. in 25 ml. of 6N HCl to regenerate the amine hydrochloride and soluble, active streptomycin.

EXAMPLE 24

*1,3-bis-(2,4-dichlorobenzyl)-2-streptomycyl-tetrahydroimidazole sulfate*

A solution of 3.8 grams of N,N'-bis-(2,4-dichlorobenzyl)-ethylenediamine (picrate melts about 183° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(2,4-dichlorobenzyl)-2-streptomycyl-tetrahydroimidazole sulfate, precipitates upon cooling as a somewhat yellow oil which on standing becomes crystalline. The crystals are removed by filtration and dried in vacuo.

A 1.5 gram sample of this imidazole is heated for three hours at 100° C. in 25 ml. of 6N HCl to regenerate the amine hydrochloride and soluble, active streptomycin.

EXAMPLE 25

*1,3-bis-(p-nitrobenzyl)-2-streptomycyl-tetrahydroimidazole sulfate*

A solution of 3.3 grams of N,N'-bis-(p-nitrobenzyl)-ethylenediamine (dihydrochloride melts about 290° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The alcohol is removed by distillation in vacuo below 50° C. and replaced by water; upon cooling the product, 1,3-bis-(p-nitrobenzyl)-2-streptomycyl-tetrahydroimidazole sulfate, precipitates as a gum which gradually solidifies upon seeding.

A 1.5 gram sample of this imidazole is heated for three hours at 100° C. in 25 ml. of 6N HCl to regenerate the amine hydrochloride and soluble, active streptomycin.

EXAMPLE 26

*1,3-bis-(p-aminobenzyl)-2-streptomycyl-tetrahydroimidazole sulfate*

A solution of 2.7 grams of N,N'-bis-(p-aminobenzyl)-ethylenediamine (dihydrochloride melts above 300° C.) dissolved in the minimum amount of methanol is added to 7.3 g. streptomycin dissolved in 50 ml. water. The minimum amount of ethanol is added to ensure complete solution. After heating at 45°–50° C. for ten minutes, the reaction mixture is allowed to stand at room temperature for three days. The product, 1,3-bis-(p-aminobenzyl)-2-streptomycyl-tetrahydroimidazole sulfate, precipitates upon the addition of water and is filtered off and dried.

A 1.5 gram sample of this imidazole is heated for three hours at 100° C. in 25 ml. of 6N HCl to regenerate the amine hydrochloride and soluble, active streptomycin.

EXAMPLE 27

*1,3-bis-(p-methoxybenzyl)-2-streptomycyl-tetrahydroimidazole sulfate*

A solution of 3.0 grams of N,N'-bis-(p-methoxybenzyl)-ethylenediamine (dihydrochloride melts about 285° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Upon cooling and the careful addition of water, the solid 1,3-bis-(p-methoxybenzyl)-2-streptomycyl-tetrahydroimidazole sulfate separates and is collected by filtration.

A 1.5 gram sample of this imidazole is heated for three hours at 100° C. in 25 ml. of 6N HCl to regenerate the amine hydrochloride and soluble, active streptomycin.

EXAMPLE 28

*1,3-bis-(2-thenyl)-2-streptomycyl-tetrahydroimidazole sulfate*

A solution of 2.5 grams of N,N'-bis-(2-thenyl)-ethylenediamine (diacetate melts about 84° C.) dissolved in the minimum amount of methanol is added to 713 g. streptomycin sulfate dissolved in 50 ml. water. The minimum amount of ethanol is added to ensure complete solution. After heating at 45°–50° C. for ten minutes, the reaction mixture is allowed to stand at room temperature for three days. After cooling, the crystalline product, 1,3-bis-(2-thenyl)-2-streptomycyl-tetrahydroimidazole sulfate, is filtered off and dried.

A 1.5 gram sample of this imidazole is heated for three hours at 100° C. in 25 ml. of 6N HCl to regenerate the amine hydrochloride and soluble, active streptomycin.

EXAMPLE 29

*1,3-bis-(2-methyl-cyclohexylmethyl)-2-streptomycyl-tetrahydroimidazole sulfate*

A solution of 2.8 grams of N,N'-bis-(2-methyl-cyclohexylmethyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Lyophilization of the reaction mixture leaves solid 1,3-bis-(2-methyl-cyclohexylmethyl)-2-streptomycyl-tetrahydroimidazole sulfate.

A 1.5 gram sample of this imidazole is heated for three hours at 100° C. in 25 ml. of 6N HCl to regenerate the amine hydrochloride and soluble, active streptomycin.

EXAMPLE 30

*1,3-bis-(3-methyl-cyclohexylmethyl)-2-streptomycyl-tetrahydroimidazole sulfate*

A solution of 2.8 grams of N,N'-bis-(3-methyl-cyclohexylmethyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The alcohol is removed by distillation in vacuo below 50° C. and replaced by water; upon cooling the product, 1,3-bis-(3-methyl-cyclohexylmethyl)-2-streptomycyl-tetrahydroimidazole sulfate, precipitates as a gum which gradually solidifies upon seeding.

A 1.5 gram sample of this imidazole is heated for three hours at 100° C. in 25 ml. of 6N HCl to regenerate the amine hydrochloride and soluble, active streptomycin.

EXAMPLE 31

*1,3-bis-(4-methyl-cyclohexylmethyl)-2-streptomycyl-tetrahydroimidazole sulfate*

A solution of 2.8 grams of N,N'-bis-(4-methyl-cyclohexylmethyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The precipitate of 1,3-bis-(4-methyl-cyclohexylmethyl)-2-streptomycyl-tetrahydroimidazole sulfate which separates upon the addition of water is collected by filtration and dried.

A 1.5 gram sample of this imidazole is heated for three hours at 100° C. in 25 ml. of 6N HCl to regenerate the amine hydrochloride and soluble, active streptomycin.

EXAMPLE 32

*1,3-bis-(4-methoxy-cyclohexylmethyl)-2-streptomycyl-tetrahydroimidazole sulfate*

A solution of 3.1 grams of N,N'-bis-(4-methoxy-cyclohexylmethyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(4-methoxy-cyclohexylmethyl)-2-streptomycyl-tetrahydroimidazole sulfate, is recovered as a nearly white solid by removing the solvents by distillation in vacuo.

A 1.5 gram sample of this imidazole is heated for three hours at 100° C. in 25 ml. of 6N HCl to regenerate the amine hydrochloride and soluble, active streptomycin.

EXAMPLE 33

*1,3-bis-(3-methoxy-cyclohexylmethyl)-2-streptomycyl-tetrahydroimidazole sulfate*

A solution of 2.2 grams of N,N'-bis(3-methoxy-cyclohexylmethyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(3-methoxy-cyclohexylmethyl)-2-streptomycyl-tetrahydroimidazole sulfate, is recovered as a solid by lyophilization.

A 1.5 gram sample of this imidazole is heated for three hours at 100° C. in 25 ml. of 6N HCl to regenerate the amine hydrochloride and soluble, active streptomycin.

EXAMPLE 34

*1,3-bis-2-(2-methylthenyl)-2-streptomycyl-tetrahydroimidazole sulfate*

A solution of 2.8 grams of N,N'-bis-2-(2-methylthenyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand for three days at room temperature. The product, 1,3-bis-2-(2-methylthenyl)-2-streptomycyltetrahydroimidazole sulfate, precipitates upon cooling as a somewhat yellow oil which on standing becomes crystalline. The crystals are removed by filtration and dried in vacuo.

A 1.5 gram sample of this imidazole is heated for three hours at 100° C. in 25 ml. of 6N HCl to regenerate the amine hydrochloride and soluble, active streptomycin.

EXAMPLE 35

*1,3-bis-2-(quinolylethyl)-2-streptomycyl-tetrahydroimidazole sulfate*

A solution of 3.7 grams of N,N'-bis-2-(quinolylethyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-2-(quinolylethyl)-2-streptomycyl-tetrahydroimidazole sulfate, precipitates upon the addition of water and is filtered off and dried.

A 1.5 gram sample of this imidazole is heated for three hours at 100° C. in 25 ml. of 6N HCl to regenerate the amine hydrochloride and soluble, active streptomycin.

EXAMPLE 36

1-benzyl-3-alpha-ethylbenzyl-2-streptomycyl-tetrahydroimidazole sulfate

A solution of 2.7 grams of N-benzyl-N'-alpha-ethylbenzyl-ethylenediamine (dihydrochloride melts about 306° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The solid product, 1-benzyl-3-alpha-ethylbenzyl-2-streptomycyl - tetrahydro - imidazole sulfate, precipitates upon seeding and the addition of water and is collected by filtration and dried.

A 1.5 gram sample of this imidazole is heated for three hours at 100° C. in 25 ml. of 6N HCl to regenerate the amine hydrochloride and soluble, active streptomycin.

EXAMPLE 37

1,3-bis-(p-methylbenzyl)-2-streptomycyl-tetrahydroimidazole sulfate

A solution of 2.7 grams of N,N'-bis-(p-methylbenzyl)-ethylenediamine (diacetate melts about 116° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Upon cooling and the careful addition of water, the solid 1,3-bis-(p-methylbenzyl)-2-streptomycyl-tetrahydroimidazole sulfate separates and is collected by filtration.

A 1.5 gram sample of this imidazole is heated for three hours at 100° C. in 25 ml. of 6N HCl to regenerate the amine hydrochloride and soluble, active streptomycin.

EXAMPLE 38

1,3-bis(m-methylbenzyl)-2-streptomycyl-tetrahydroimidazole sulfate

A solution of 2.7 grams of N,N'-bis(m-methylbenzyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand for three days at room temperature. After cooling, the crystalline product, 1,3-bis(m-methylbenzyl)-2-streptomycyl-tetrahydroimidazole sulfate, is filtered off and dried.

A 1.5 gram sample of this imidazole is heated for three hours at 100° C. in 25 ml. of 6N HCl to regenerate the amine hydrochloride and soluble, active streptomycin.

EXAMPLE 39

1,3-bis(o-methylbenzyl)-2-streptomycyl-tetrahydroimidazole sulfate

A solution of 2.7 grams of N,N'-bis(o-methylbenzyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Lyophilization of the reaction mixture leaves solid 1,3-bis(o-methylbenzyl)-2-streptomycyl-tetrahydroimidazole sulfate.

A 1.5 gram sample of this imidazole is heated for three hours at 100° C. in 25 ml. of 6N HCl to regenerate the amine hydrochloride and soluble, active streptomycin.

EXAMPLE 40

1,3-bis-(beta-phenylethyl)-2-streptomycyl-tetrahydroimidazole sulfate

A solution of 3.0 grams of N,N'-bis-(beta-phenylethyl)-ethylenediamine (diacetate melts about 114° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The alcohol is removed by distillation in vacuo below 50° C. and replaced by water; upon cooling the product, 1,3-bis-(beta-phenylethyl)-2-streptomycyl-tetrahydroimidazole sulfate, precipitates as a gum which gradually solidifies upon seeding.

A 1.5 gram sample of this imidazole is heated for three hours at 100° C. in 25 ml. of 6N HCl to regenerate the amine hydrochloride and soluble, active streptomycin.

EXAMPLE 41

1,3-bis-(lauryl)-2-streptomycyl-tetrahydroimidazole sulfate

A solution of 4.0 grams of N,N'-bis-(lauryl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The precipitate of 1,3-bis-(lauryl)-2-streptomycyl-tetrahydroimidazole sulfate which separates upon the addition of water is collected by filtration and dried.

A 1.5 gram sample of this imidazole is heated for three hours at 100° C. in 25 ml. of 6N HCl to regenerate the amine hydrochloride and soluble, active streptomycin.

EXAMPLE 42

1,3 - bis - (3 - methylcyclohexyl) - 2 - streptomycyl-tetrahydroimidazole sulfate A solution of 2.5 grams of N,N'-bis-(3-methylcyclohexyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3 - bis - (3 - methylcyclohexyl)-2-streptomycyl-tetrahydroimidazole sulfate, is recovered as a nearly white solid by removing the solvents by distillation in vacuo.

A 1.5 gram sample of this imidazole is heated for three hours at 100° C. in 25 ml. of 6N HCl to regenerate the amine hydrochloride and soluble, active streptomycin.

EXAMPLE 43

1,3 - bis - (2 - methylcyclohexyl) - 2 - streptomycyl-tetrahydroimidazole sulfate A solution of 2.5 grams of N,N'-bis-(2-methylcyclohexyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3 - bis - (2 - methylcyclohexyl)-2 - streptomycyl - tetrahydroimidazole sulfate, is recovered as a solid by lyophilization.

A 1.5 gram sample of this imidazole is heated for three hours at 100° C. in 25 ml. of 6N HCl to regenerate the amine hydrochloride and soluble, active streptomycin.

EXAMPLE 44

*1,3 - bis - (4 - methylcyclohexyl) - 2 - streptomycyl-tetrahydroimidazole sulfate*

A solution of 2.5 grams of N,N'-bis-(4-methylcyclohexyl) - ethylenediamine dissolved in the minimum amount of methanol is added to 7.3 g. streptomycin sulfate dissolved in 50 ml. of water. The minimum amount of ethanol is added to ensure complete solution. After heating at 45–50° C. for ten minutes, the reaction mixture is allowed to stand at room temperature for three days. The product, 1,3-bis-(4-methylcyclohexyl)-2-streptomycyl-tetrahydroimidazole sulfate, precipitates upon cooling as a somewhat yellow oil which on standing becomes crystalline. The crystals are removed by filtration and dried in vacuo.

A 1.5 gram sample of this imidazole is heated for three hours at 100° C. in 25 ml. of 6N HCl to regenerate the amine hydrochloride and soluble, active streptomycin.

EXAMPLE 45

*1,3 - bis - (3 - nitrophenyl) - 2 - streptomycyl-tetrahydroimidazole sulfate*

A solution of 3.3 grams of N,N'-bis-(3-nitrophenyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3 - bis - (3 - nitrophenyl) - 2 - streptomycyl-tetrahydroimidazole sulfate, precipitates upon the addition of water and is filtered off and dried.

A 1.5 gram sample of this imidazole is heated for three hours at 100° C. in 25 ml. of 6N HCl to regenerate the amine hydrochloride and soluble, active streptomycin.

EXAMPLE 46

*1,3-bis-2-(6-methylpyridyl)-2-streptomycyl-tetrahydroimidazole sulfate*

A solution of 2.4 grams of N,N'-bis-2-(6-methylpyridyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The solid product, 1,3-bis-2-(6-methylpyridyl)-2-streptomycyl-tetrahydroimidazole sulfate, precipitates upon seeding and the addition of water and is collected by filtration and dried.

A 1.5 gram sample of this imidazole is heated for three hours at 100° C. in 25 ml. of 6N HCl to regenerate the amine hydrochloride and soluble, active streptomycin.

EXAMPLE 47

*1,3-bis-2-(5-methylpyridyl)-2-streptomycyl-tetrahydroimidazole sulfate*

A solution of 2.4 grams of N,N'-bis-2-(5-methylpyridyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Upon cooling and the careful addition of water, the solid 1,3-bis-2-(5-methylpyridyl)-2-streptomycyl-tetrahydroimidazole sulfate separates and is collected by filtration.

A 1.5 gram sample of this imidazole is heated for three hours at 100° C. in 25 ml. of 6N HCl to regenerate the amine hydrochloride and soluble, active streptomycin.

EXAMPLE 48

*1,3-bis-2-(4-methylpyridyl)-2-streptomycyl-tetrahydroimidazole sulfate*

A solution of 2.4 grams of N,N'-bis-2-(4-methylpyridyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. After cooling, the crystalline product, 1,3-bis-2-(4-methylpyridyl)-2-streptomycyl-tetrahydroimidazole sulfate, is filtered off and dried.

A 1.5 gram sample of this imidazole is heated for three hours at 100° C. in 25 ml. of 6N HCl to regenerate the amine hydrochloride and soluble, active streptomycin.

EXAMPLE 49

*1,3-bis-2-(3-methylpyridyl)-2-streptomycyl-tetrahydroimidazole sulfate*

A solution of 2.4 grams of N,N'-bis-2-(3-methylpyridyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Lyophilization of the reaction mixtures leaves solid 1,3-bis - 2 - (3 - methylpyridyl) - 2 - streptomycyl - tetrahydroimidazole sulfate.

A 1.5 gram sample of this imidazole is heated for three hours at 100° C. in 25 ml. of 6N HCl to regenerate the amine hydrochloride and soluble, active streptomycin.

EXAMPLE 50

*1,3-bis-2-thiazolyl-2-streptomycyl-tetrahydroimidazole sulfate*

A solution of 2.3 grams of N,N'-bis-2-thiazolyl-ethylenediamine dissolved in the minimum amount of methanol is added to 7.3 grams streptomycin sulfate dissolved in 50 ml. water. The minimum amount of ethanol is added to ensure complete solution. After heating at 45°–50° C. for ten minutes, the reaction mixture is allowed to stand at room temperature for three days. The alcohol is removed by distillation in vacuo below 50° C. and replaced by water; upon cooling the product, 1,3-bis-2 - thiazolyl - 2 - streptomycyl - tetrahydroimidazole sulfate, precipitates as a gum which gradually solidifies upon seeding.

A 1.5 gram sample of this imidazole is heated for three hours at 100° C. in 25 ml. of 6N HCl to regenerate the amine hydrochloride and soluble, active streptomycin.

EXAMPLE 51

*1,3-bis-2(5-methylfuryl)-2-streptomycyl-tetrahydroimidazole sulfate*

A solution of 2.2 grams of N,N'-bis-2(5-methylfuryl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The precipitate of 1,3-bis-2(5-methylfuryl)-2-streptomycyl-tetrahydroimidazole sulfate which separates upon the addition of water is collected by filtration and dried.

A 1.5 gram sample of this imidazole is heated for three hours at 100° C. in 25 ml. of 6N HCl to regenerate the amine hydrochloride and soluble, active streptomycin.

EXAMPLE 52

*1,3-bis-(p-hydroxybenzyl)-2-streptomycyl-tetrahydroimidazole sulfate*

A solution of 2.7 grams of N,N'-bis-(p-hydroxybenzyl)-ethylenediamine (dihydrochloride melts about 242° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(p-hydroxybenzyl) - 2 - streptomycyl-tetrahydroimidazole sulfate, is recovered as a nearly white solid by removing the solvents by distillation in vacuo.

A 1.5 gram sample of this imidazole is heated for three hours at 100° C. in 25 ml. of 6N HCl to regenerate the amine hydrochloride and soluble, active streptomycin.

EXAMPLE 53

*1,3-bis-(cyclopentyl)-2-streptomycyl-tetrahydroimidazole sulfate*

A solution of 2.0 grams of N,N'-bis-(cyclopentyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(cyclopentyl)-2-streptomycyl-tetrahydroimidazole sulfate, is recovered as a solid by lyophilization.

A 1.5 gram sample of this imidazone is heated for three hours at 100° C. in 25 ml. of 6N HCl to regenerate the amine hydrochloride and soluble, active streptomycin.

EXAMPLE 54

*1,3-bis-(undecyl)-2-streptomycyl-tetrahydroimidazole sulfate*

A solution of 3.7 grams of N,N'-bis(undecyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(undecyl)-2-streptomycyl-tetrahydroimidazole sulfate, precipitates upon cooling as a somewhat yellow oil which on standing becomes crystalline. The crystals are removed by filtration and dried in vacuo.

A 1.5 gram sample of this imidazole is heated for three hours at 100° C. in 25 ml. of 6N HCl to regenerate the amine hydrochloride and soluble, active streptomycin.

EXAMPLE 55

*1,3-bis-(4-methoxycyclohexyl)-2-streptomycyl-tetrahydroimidazole sulfate*

A solution of 2.8 grams of N,N'-bis-(4-methoxycyclohexyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(4-methoxycyclohexyl)-2-streptomycyl-tetrahydroimidazole sulfate, precipitates upon the addition of water and is filtered off and dried.

A 1.5 gram sample of this imidazole is heated for three hours at 100° C. in 25 ml. of 6N HCl to regenerate the amine hydrochloride and soluble, active streptomycin.

EXAMPLE 56

*1,3-bis-(vanillyl)-2-streptomycyl-tetrahydroimidazole sulfate*

A solution of 3.3 grams of N,N'-bis-(vanillyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The solid product, 1,3-bis-(vanillyl)-2-streptomycyl-tetrahydroimidazole sulfate, precipitates upon seeding and the addition of water and is collected by filtration and dried.

A 1.5 gram sample of this imidazole is heated for three hours at 100° C. in 25 ml. of 6N HCl to regenerate the amine hydrochloride and soluble, active streptomycin.

EXAMPLE 57

*1-cyclohexyl-3-ethyl-2-streptomycyl-tetrahydroimidazole sulfate*

A solution of 1.7 grams of N-cyclohexyl-N'-ethyl-ethylenediamine dissolved in the minimum amount of methanol is added to 7.3 grams streptomycin sulfate dissolved in 50 ml. water. The minimum amount of ethanol is added to ensure complete solution. After heating at 45°–50° C. for ten minutes, the reaction mixture is allowed to stand at room temperature for three days. Upon cooling and the careful addition of water, the solid 1 - cyclohexyl-3-ethyl-2-streptomycyl-tetrahydroimidazole sulfate separates and is collected by filtration.

A 1.5 gram sample of this imidazole is heated for three hours at 100° C. in 25 ml. of 6N HCl to regenerate the amine hydrochloride and soluble, active streptomycin.

EXAMPLE 58

*1-benzyl-3-vanillyl - 2 - streptomycyl-tetrahydroimidazole sulfate*

A solution of 2.9 grams of N-benzyl-N'-vanillyl-ethylene-diamine dissolved in the minimum amount of methanol is added to 7.3 grams streptomycin sulfate dissolved in 50 ml. water. The minimum amount of ethanol is added to ensure complete solution. After heating at 45°–50° C. for ten minutes, the reaction mixture is allowed to stand at room temperature for three days. After cooling, the crystalline product, 1-benzyl-3-vanillyl-2-streptomycyl-tetrahydroimidazole sulfate, is filtered off and dried.

A 1.5 gram sample of this imidazole is heated for three hours at 100° C. in 25 ml. of 6N HCl to regenerate the amine hydrochloride and soluble, active streptomycin.

EXAMPLE 59

*1,3-di-n-butyl-2-streptomycyl-tetrahydroimidazole sulfate*

A solution of 1.7 grams of N,N'-di-n-butyl-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Lyophilization of the reaction mixture leaves solid 1,3-di-n-butyl-2-streptomycyl-tetrahydroimidazole sulfate.

A 1.5 gram sample of this imidazole is heated for three hours at 100° C. in 25 ml. of 6N HCl to regenerate the amine hydrochloride and soluble, active streptomycin.

EXAMPLE 60

*1,3-di-iso-butyl-2-streptomycyl-tetrahydroimidazole sulfate*

A solution of 1.7 grams of N,N'-di-iso-butyl-ethylenediamine dissolved in the minimum amount of methanol is added to 7.3 g. streptomycin sulfate dissolved in 50 ml. water. The minimum amount of ethanol is added to ensure complete solution. After heating at 45°–50° C.

for ten minutes the reaction mixture is allowed to stand at room temperature for three day. The alcohol is removed by distillation in vacuo below 50° C. and replaced by water; upon cooling the product, 1,3-di-iso-butyl-2-streptomycyl-tetrahydroimidazole sulfate, precipitates as a gum which gradually solidifies upon seeding.

A 1.5 gram sample of this imidazole is heated for three hours at 100° C. in 25 ml. of 6N HCl to regenerate the amine hydrochloride and soluble, active streptomycin.

EXAMPLE 61

*1,3-di-sec.-butyl - 2 - streptomycyl - tetrahydroimidazole sulfate*

A solution of 1.7 grams of N,N'-di-sec.-butyl-ethylenediamine dissolved in the minimum amount of methanol is added to 7.3 g. streptomycin sulfate dissolved in 50 ml. water. The minimum amount of ethanol is added to ensure complete solution. After heating at 45°–50° C. ten minutes, the reaction mixture is allowed to stand at room temperature for three days. The precipitate of 1,3-di-sec.-butyl - 2 - streptomycyl-tetrahydroimidazole sulfate which separates upon the addition of water is collected by filtration and dried.

A 1.5 gram sample of this imidazole is heated for three hours at 100° C. in 25 ml. of 6N HCl to regenerate the amine hydrochloride and soluble, active streptomycin.

EXAMPLE 62

*1,3 - bis-(1-naphthyl)-2-streptomycyl-tetrahydroimidazole sulfate*

A solution of 3.1 grams of N,N'-bis-(1-naphthyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The precipitate of 1,3-bis-(1-naphthyl)-2-streptomycyl-tetrahydroimidazole sulfate is recovered as a nearly white solid by removing the solvents by distillation in vacuo.

A 1.5 gram sample of this imidazole is heated for three hours at 100° C. in 25 ml. 6N HCl to regenerate the amine hydrochloride and soluble, active streptomycin.

EXAMPLE 63

*1,3 - bis-(2-naphthyl)-2-streptomycyl-tetrahydroimidazole sulfate*

A solution of 3.1 grams of N,N'-bis-(2-naphthyl)-ethylenediamine dissolved in the minimum amount of methanol is added to 7.3 g. streptomycin sulfate dissolved in 50 ml. water. The minimum amount of ethanol is added, to ensure complete solution. After heating at 45°–50° C. for ten minutes, the reaction mixture is allowed to stand at room temperature for three days. Upon cooling and the careful addition of water, the solid 1.3-bis-(2-naphthyl)-2-streptomycyl-tetrahydroimidazole sulfate separates and is collected by filtration.

A 1.5 gram sample of this imidazole is heated for three hours at 100° C. in 25 ml. of 6N HCl to regenerate the amine hydrochloride and soluble, active streptomycin.

EXAMPLE 64

*1,3-bis-(2-pyridyl)-2-streptomycyl-tetrahydroimidazole sulfate*

A solution of 2.1 grams of N,N'-bis-(2-pyridyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3 - bis - (2-pyridyl)-2-streptomycyl-tetrahydroimidazole sulfate, is recovered as a solid by lyophilization.

A 1.5 gram sample of this imidazole is heated for three hours at 100° C. in 25 ml. of 6N HCl to regenerate the amine hydrochloride and soluble, active streptomycin.

EXAMPLE 65

*1,3 - bis-(benzhydryl)-2-streptomycyl-tetrahydroimidazole sulfate*

A solution of 3.9 grams of N,N'-bis-(benzhydryl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(benzhydryl)-2-streptomycyl-tetrahydroimidazole sulfate, precipitates upon cooling as a somewhat yellow oil which on standing becomes crystalline. The crystals are removed by filtration and dried in vacuo.

A 1.5 gram sample of this imidazole is heated for three hours at 100° C. in 25 ml. of 6N HCl to regenerate the amine hydrochloride and soluble, active streptomycin.

EXAMPLE 66

*1,3-bis-(3,4-dimethoxybenzyl)-2-streptomycyl-tetrahydroimidazole sulfate*

A solution of 3.6 grams of N,N'-bis-(3,4-dimethoxybenzyl) - ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(3,4-dimethoxybenzyl)-2-streptomycyl-tetrahydroimidazole sulfate, is recovered as a nearly white solid by removing the solvents by distillation in vacuo.

A 1.5 gram sample of this imidazole is heated for three hours at 100° C. in 25 ml. 6N HCl to regenerate the amine hydrochloride and soluble, active streptomycin.

EXAMPLE 67

*1,3-bis-(amyl)-2-streptomycyl-tetrahydroimidazole sulfate*

A solution of 2.0 grams of N,N'-bis-(amyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The solid product, 1,3-bis-(amyl)-2-streptomycyl-tetrahydromimidazole sulfate, precipitates upon seeding and the addition of water and is collected by filtration and dried.

A 1.5 gram sample of this imidazole is heated for three hours at 100° C. in 25 ml. of 6N HCl to regenerate the amine hydrochloride and soluble, active streptomycin.

EXAMPLE 68

*1-benzyl-3-p-methoxybenzyl-2-streptomycyl-tetrahydroimidazole sulfate*

A solution of 2.7 grams of N-benzyl-N'-p-methoxybenzyl-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1-benzyl-3-p-methoxybenzyl-2-streptomycyl-tetrahydroimidazole sulfate, precipitates upon the addition of water and is filtered off and dried.

A 1.5 gram sample of this imidazole is heated for three hours at 100° C. in 25 ml. of 6N HCl to regenerate the amine hydrochloride and soluble, active streptomycin.

EXAMPLE 69

*1-ethyl-3-phenethyl-2-streptomycyl-tetrahydroimidazole sulfate*

A solution of 1.9 grams of N-ethyl-N'-phenethylethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Upon cooling and the careful addition of water, the solid 1-ethyl - 3 - phenethyl-2-streptomycyl-tetrahydroimidazole sulfate separates and is collected by filtration.

A 1.5 gram sample of this imidazole is heated for three hours at 100° C. in 25 ml. of 6N HCl to regenerate the amine hydrochloride and soluble, active streptomycin.

EXAMPLE 70

*1,3-bis-(orthochlorobenzyl)-2-streptomycyl-tetrahydroimidazole sulfate*

A solution of 3.1 grams of N,N'-bis-(orthochlorobenzyl)-ethylenediamine (dipenicillin G salt melts about 133° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. After cooling, the crystalline product, 1,3-bis-(orthochlorobenzyl)-2-streptomycyl-tetrahydroimidazole sulfate, is filtered off and dried.

A 1.5 gram sample of this imidazole is heated for three hours at 100° C. in 25 ml. of 6N HCl to regenerate the amine hydrochloride and soluble, active streptomycin.

EXAMPLE 71

*1,3-bis-(orthohydroxybenzyl)-2-streptomycyl-tetrahydroimidazole sulfate*

A solution of 2.7 grams of N,N'-bis-(orthohydroxybenzyl)-ethylenediamine (dipenicillin G salt melts about 115° C.) dissolved in the minimum amount of methanol is added to 7.3 grams streptomycin sulfate dissolved in 50 ml. water. The minimum amount of ethanol is added to ensure complete solution. After heating at 45°–50° C. for ten minutes, the reaction mixture is allowed to stand at room temperature for three days. Lyophilization of the reaction mixture leaves solid 1,3 - bis-(orthohydroxybenzyl)-2-streptomycyl-tetrahydroimidazole sulfate.

A 1.5 gram sample of this imidazole is heated for three hours at 100° C. in 25 ml. of 6N HCl to regenerate the amine hydrochloride and soluble, active streptomycin.

EXAMPLE 72

*1-benzyl-3-(2-hydroxylbenzyl)-2-streptomycyl-tetrahydroimidazole sulfate*

A solution of 2.6 grams of N-benzyl-N'-(2-hydroxylbenzyl)-ethylenediamine (dipenicillin G salt melts about 126° C.) dissolved in the minimum amount of methanol is added to 7.3 g. streptomycin sulfate dissolved in 50 ml. water. The minimum amount of ethanol is added to ensure complete solution. After heating at 45–50° C. for ten minutes, the reaction mixture is allowed to stand at room temperature for three days. The alcohol is removed by distillation in vacuo below 50° C. and replaced by water; upon cooling the product, 1-benzyl-3-(2-hydroxylbenzyl) - 2 - streptomycyl-tetrahydroimidazole sulfate, precipitates as a gum which gradually solidifies upon seeding.

A 1.5 gram sample of this imidazole is heated for three hours at 100° C. in 25 ml. of 6N HCl to regenerate the amine hydrochloride and soluble, active streptomycin.

EXAMPLE 73

*1-benzyl-3-(3-ethoxy-4-hydroxybenzyl)-2-streptomycyl-tetrahydroimidazole sulfate*

A solution of 3.0 grams of N-benzyl-N'-(3-ethoxy-4-hydroxybenzyl) - ethylenediamine (dipenicillin G salt melts about 120° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The precipitate of 1 - benzyl - 3 - (3 - ethoxy-4-hydroxybenzyl) - 2 - streptomycyl - tetrahydroimidazole sulfate which separates upon the addition of water is collected by filtration and dried.

A 1.5 gram sample of this imidazole is heated for three hours at 100° C. in 25 ml. of 6N HCl to regenerate the amine hydrochloride and soluble, active streptomycin.

EXAMPLE 74

*4-methyl-1,3-di-n-heptyl-2-streptomycyl-tetrahydroimidazole sulfate*

A solution of 2.7 grams of 1-methyl-N,N'-di-n-heptyl-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 4 - methyl-1,3-di-n-heptyl-2-streptomycyl-tetrahydroimidazole sulfate, is recovered as a nearly white solid by removing the solvents by distillation in vacuo.

A 1.5 gram sample of this imidazole is heated for three hours at 100° C. in 25 ml. of 6N HCl to regenerate the amine hydrochloride and soluble, active streptomycin.

EXAMPLE 75

*4,5-dimethyl-1,3-dibenzyl-2-streptomycyl-tetrahydroimidazole sulfate*

A solution of 2.6 grams of 1,2-dimethyl-N,N'-dibenzyl-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 4,5-dimethyl-1,3-dibenzyl-2-streptomycyl-tetrahydroimidazole sulfate, is recovered as a solid by lyophilization.

A 1.5 gram sample of this imidazole is heated for three hours at 100° C. in 25 ml. of 6N HCl to regenerate the amine hydorchloride and soluble, active streptomycin.

EXAMPLE 76

*4-methyl-1,3-dibenzyl-2-streptomycyl-tetrahydroimidazole sulfate*

A solution of 2.5 grams of 1-methyl-N,N'-dibenzyl-ethylenediamine dissolved in the minimum amount of methanol is added to 7.3 grams streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 4-methyl-1,3-dibenzyl-2-streptomycyl-tetrahydroimidazole sulfate, precipitates upon cooling as a somewhat yellow oil which on standing becomes crystalline. The crystals are removed by filtration and dried in vacuo.

A 1.5 gram sample of this imidazole is heated for three hours at 100° C. in 25 ml. of 6N HCl to regenerate the amine hydrochloride and soluble, active streptomycin.

EXAMPLE 77

4,5 - dimethyl - 1,3 - di - n - heptyl - 2 - streptomycyl-tetrahydroimidazole sulfate

A solution of 2.8 grams of 1,2-dimethyl-N,N'-di-n-heptylethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 4,5 - dimethyl - 1,3-di-n-heptyl-2-streptomycyl-tetrahydroimidazole sulfate, precipitates upon the addition of water and is filtered off and dried.

A 1.5 gram sample of this imidazole is heated for three hours at 100° C. in 25 ml. of 6N HCl to regenerate the amine hydrochloride and soluble, active streptomycin.

EXAMPLE 78

4,5 - dimethyl - 1,3 - di - cyclohexylmethyl - 2 - streptomycyltetrahydroimidazole sulfate

A solution of 2.7 grams of 4,5-dimethyl-1,3-di-cyclohexylmethyl-2-streptomycyl-tetrahydroimidazole sulfate dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The solid product, 4,5 - dimethyl - 1,3 - dicyclohexylmethyl - 2 - streptomycyltetrahydroimidazole sulfate, precipitates upon seeding and the addition of water and is collected by filtration and dried.

A 1.5 gram sample of this imidazole is heated for three hours at 100° C. in 25 ml. of 6N HCl to regenerate the amine hydrochloride and soluble, active streptomycin.

EXAMPLE 79

4 - methyl - 1,3 - di - cyclohexylmethyl - 2 - streptomycyl-tetrahydroimidazole sulfate

A solution of 2.6 grams of 1-methyl-N,N'-di-cyclohexylmethylethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Upon cooling and the careful addition of water, the solid 4-methyl-1,3-di-cyclohexylmethyl-2-streptomycyl-tetrahydroimidazole sulfate separates and is collected by filtration.

A 1.5 gram sample of this imidazole is heated for three hours at 100° C. in 25 ml. of 6N HCl to regenerate the amine hydrochloride and soluble, active streptomycin.

EXAMPLE 80

4,5 - dimethyl - 1,3 - di - cyclohexyl - 2 - streptomycyl-tetrahydroimidazole sulfate

A solution of 2.4 grams of 1,2-dimethyl-N,N'-di-cyclohexylethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. After cooling, the crystalline product, 4,5-dimethyl-1,3-di-cyclohexyl-2-streptomycyl-tetrahydroimidazole sulfate, is filtered off and dried.

A 1.5 gram sample of this imidazole is heated for three hours at 100° C. in 25 ml. of 6N HCl to regenerate the amine hydrochloride and soluble, active streptomycin.

EXAMPLE 81

4 - methyl - 1,3 - di-cyclohexyl - 2 - streptomycyl-tetrahydroimidazole sulfate

A solution of 2.3 grams of 1-methyl-N, N'-di-cyclohexylethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand for three days at room temperature. Lyophilization of the reaction mixture leaves solid 4-methyl - 1,3 - di - cyclohexyl - 2 - streptomycyl-tetrahydroimidazole sulfate.

A 1.5 gram sample of this imidazole is heated for three hours at 100° C. in 25 ml. of 6N HCl to regenerate the amine hydrochloride and soluble, active streptomycin.

EXAMPLE 82

1,3-dibenzyl-2-streptomycyl-tetrahydroimidazole sulfate

Eight grams of solid streptomycin sulfate (potency-475 u./mgm. by B. subtilis assay; partially purified by adsorption on and elution from ion-exchange resin columns) was dissolved in 50 ml. water and admixed with a solution of 10 mls. N,N'-dibenzyl-ethylenediamine in 70 mls. methanol to give a clear solution which was heated to 50° C. for one hour. 1,3-dibenzyl-2-streptomycyl-tetrahydroimidazole sulfate (7.64 grams) precipitated and was collected by filtration, dried over $P_2O_5$ and found to assay 600 units/mgm. The filtrate (78 mls.) assayed 2880 units/ml.

7.5 grams of this 1,3-dibenzyl-2-streptomycyl-tetrahydroimidazole sulfate were placed in water and the pH was adjusted to pH 2 with sulfuric acid. N,N'-dibenzyl-ethylenediamine sulfate precipitated and was collected by filtration (1.04 g.). Addition of five volumes of methanol to the filtrate precipitated solid streptomycin sulfate (4.08 g.) assaying 625 u./mgm.

EXAMPLE 83

Fifty mls. of streptomycin liquor assaying 182,000 units/ml. (B. subtilis assay) and obtained by elution of broth adsorbed on an ion-exchange resin column was added to 10 mls. N,N'-dibenzylethylenediamine in 65 mls. methanol, liberating heat and giving a clear solution which was heated to 50° C. for one hour and then allowed to stand overnight. 1,3-dibenzyl-2-streptomycyl-tetrahydroimidazole sulfate precipitated and was collected by filtration, dried over $P_2O_5$ and found to weigh 4.1 grams and to assay 528 units/mgm. The filtrate, 39 mls., assayed 2480 units/ml.

Four grams of this 1,3-dibenzyl-2-streptomycyl-tetrahydroimidazole sulfate was placed in water and the pH was adjusted to pH 2.0 with sulfuric acid. After standing, the volume was reduced by one-half by distillation in vacuo and the N,N'-dibenzyl-ethylenediamine sulfate which precipitated (0.92 g.) was removed by filtration. The addition of five volumes methanol precipitated 2.53 g. streptomycin sulfate assaying 560 units/mgm.; the filtrate (925 ml.) assayed 122 units/ml.

1,3-dibenzyl-2-streptomycyl-tetrahydroimidazole sulfate (2%) in 4% aqueous acacia suspension has $LD_{50}$ (minimum lethal dose in 50% of animals) of about 342±21 mgm./kg. by intraperitoneal injection in mice.

Streptomycin sulfate, 1,3-dibenzyl-2-streptomycyl-tetrahydroimidazole sulfate and 1,3-di(beta-phenylethyl)-2-streptomycl-tetrahydroimidazole sulfate by in vitro test all have minimum inhibitory concentrations of 0.0092 mgm/ml. against the streptomycin-sensitive strain H37Rv of Mycobacterium tuberculosis and all fail to inhibit streptomycin-resistant strain H37RvR.

The $CD_{50}$ (Curative Dose-50) is the minimum intraperitoneal dose of the drug which will cure 50 percent of a group of mice injected intraperitoneally with 100 to 1000 $LD_{50}$ doses of Diplococcus pneumoniae, each $LD_{50}$ dose being sufficient if given alone to kill 50 percent of a group of mice. One-half the dose of test drug is given twenty-four hours before the simultaneous injection of the other half of the test drug and the challenge (infection). The animals are observed for four days and deaths for each group expressed as the percentage of the total animals per group. The percentage death is transformed to probit values and these plotted against the log of the dose in mgms. per kg. of mouse weight. The point of intersection of the probit 5 line and the best line constructed through the experimental points describes the concentration of drug which should protect half the animals under the conditions of the experiment. The antilog of this term is called the $CD_{50}$ value. Using aqueous suspensions, including sodium carboxymethylcellulose and having pH about 7, of the two new drugs, the following values for $CD_{50}$ were found as above: 6.8 mgm./kg. for streptomycin sulfate; 45 mgm./kg. for 1,3-dibenzyl-2-streptomycylterahydroimidazole sulfate; and 60 mgm./kg. for 1,3-di(betaphenethyl)-2-streptomycyltetrahydroimidazole sulfate.

EXAMPLE 84

1.592 g. of micronized 1,3-dibenzyl-2-streptomycyltetrahydroimidazole sulfate was thoroughly mixed q. s. ad 20 cc. into peanut oil gelled with 2% aluminum monostearate in the manner of U. S. Patent 2,507,193. The resulting suspension contained the equivalent of about 50 mgms. streptomycin base/cc.

EXAMPLE 85

3.184 grams of 200 mesh 1,3-dibenzyl-2-streptomycyltetrahydroimidazole sulfate was thoroughly mixed q. s. ad 20 cc. into peanut oil gelled with 2% aluminum monostearate.

EXAMPLE 86

3.184 grams of micronized 1,3-dibenzyl-2-streptomycyltetrahydroimidazole sulfate was thoroughly mixed q. s. ad 20 cc. into peanut oil gelled with 2% aluminum monostearate.

EXAMPLE 87

407.8 g. of 200 mesh 1,3-dibenzyl-2-streptomycyl-tetrahydroimidazole sulfate was thoroughly mixed q. s. ad 1100 cc. into peanut oil gelled with 2% aluminum monostearate. Silicone-coated, 15 cc. vials were filled with about 11 cc. each of the suspension.

EXAMPLE 88

8.41 g. of 200 mesh 1,3-dibenzyl-2-streptomycyl-tetrahydroimidazole sulfate was thoroughly mixed q. s. ad 50 cc. into peanut oil gelled with 2% aluminum monostearate. The resulting suspension contained the equivalent of about 100 mgms. streptomycin base/cc.

EXAMPLE 89

2.52 g. of 200 mesh 1,3-dibenzyl-2-streptomycyl-tetrahydroimidazole sulfate was thoroughly mixed q. s. ad 30 cc. into peanut oil gelled with 2% aluminum monostearate. The resulting suspension contained the equivalent of about 50 mgms. streptomycin base/cc.

EXAMPLE 90

168.3 g. of 200 mesh 1,3-dibenzyl-2-streptomycyl-tetrahydroimidazole sulfate was thoroughly mixed q. s. ad 500 cc. into peanut oil gelled with 2% aluminum monostearate. The resulting suspension contained the equivalent of about 200 mgms. streptomycin base/cc.

EXAMPLE 91

Fifteen grams of 200 mesh 1,3-dibenzyl-2-streptomycyltetrahydroimidazole sulfate was thoroughly mixed into 35 cc. of peanut oil gelled with 2% aluminum monostearate to give a finished volume of 47 cc. containing the equivalent of 0.192 g. streptomycin base/cc.

EXAMPLE 92

60 grams of 200 mesh 1,3-dibenzyl-2-streptomycyltetrahydroimidazole sulftae was thoroughly mixed into 140 cc. of peanut oil gelled with 2% aluminum monostearate to give a final volume of 200 cc. containing the equivalent of 185.3 mgm. streptomycin base/cc.

EXAMPLE 93

An aqueous gel was prepared by making a one percent suspension of methylcellulose in propylene glycol, heating the mixture with stirring to 150° C. and continuing the stirring while allowing the mixture to cool to room temperature.

3.184 g. of 200 mesh 1,3-dibenzyl-2-streptomycyl-tetrahydroimidazole sulfate was thoroughly mixed q. s. ad 20 cc. into this gel to give a suspension containing the equivalent of 100 mgms. streptomycin base/cc.

EXAMPLE 94

An aqueous vehicle (called "LST" vehicle) containing 0.7% lecithin, 0.33% Span 40, and 0.93% Tween 40 is prepared by adding distilled water q. s. ad 1000 cc. to lecithin (7.0 g.), Span 40 (3.3 g.) and Tween 40 (9.3 g.), autoclaving, stirring down to room temperature and adding water to restore any loss in volume.

Eight silicone-coated, 15 cc. vials were filled with 1.851 g. 1,3-dibenzyl-2-streptomycyl-tetrahydroimidazole sulfate/vial and reconstituted by the addition of 9.53 cc./vial of the above "LST" vehicle to provide a finished volume of 11 cc. containing the equivalent of 100 mgm. streptomycin base/cc.

EXAMPLE 95

Eight silicone-coated 15 cc. vials were filled with 0.925 g. 1,3-dibenzyl-2-streptomycyl-tetrahydroimidazole sulfate/vial and reconstituted by the addition of 10.26 cc. of the above "LST" vehicle to provide a finished volume of 11 cc. containing the equivalent of 50 mgm. streptomycin base/cc.

EXAMPLE 96

Ten 15 cc. silicone-coated vials were filled with 1.851 g. 1,3-dibenzyl-2-streptomycyl-tetrahydroimidazole sulfate/vial and reconstituted by the addition of 9.53 cc. water to provide a finished volume of 11 cc. containing the equiavlent of 100 mgm. streptomycin base/cc.

EXAMPLE 97

Ten 15 cc. silicone-coated vials were filled with 0.925 g. 1,3-dibenzyl-2-streptomycyl-tetrahydroimidazole sulfate/vial and reconstituted by the addition of 10.26 cc. water to provide a finished volume of 11 cc. containing the equivalent of 100 mgm. streptomycin base/cc.

EXAMPLE 98

A vial was filled with 0.2388 g. 200 mesh 1,3-dibenzyl-2-streptomycyl-tetrahydroimidazole sulfate and 0.0282 g. polyvinylpyrrolidone and reconstituted by the addition of 2.8 cc. water to give a final volume of 3 cc. containing the equivalent of 50 mgm. streptomycin base/cc.

EXAMPLE 99

Eighteen grams of 200 mesh 1,3-dibenzyl-2-streptomycyltetrahydroimidazole sulfate were suspended in 50 cc. of a 0.7% aqeous solution of Tween 40 to give a final volume of 63.5 cc. containing the equivalent of 170 mgm. streptomycin base/cc.

EXAMPLE 100

Twenty-cc. vials were filled with 3 g. of 200 mesh 1,3-dibenzyl - 2 - streptomycyl - tetrahydroimidazole sulfate/vial and reconstituted with 7 cc./vial of a 0.7% aqueous solution of Tween 40 to give a final volume of 9.25 cc. containing the equivalent of 203.5 mgm. streptomycin base/cc.

EXAMPLE 101

300 g. micro-pulverized 1,3-dibenzyl-2-streptomycyl-tetrahydroimidazole sulfate and 35 cc. chloroform containing 3.99 g. lecithin, 1.88 g. Span 40, and 5.30 g. Tween 40 were placed in a mixer with thirty-five steel balls and mixed for seven hours. The chloroform was then driven off by a current of air at room temperature. The coated 1,3-dibenzyl-2-streptomycyltetrahydroimidazole sulfate was passed through a 250 mesh screen and then sterilized with a gaseous formaldehyde for forty hours in a mixer. Silicone-coated 20 cc. vials were filled with about 3.492 g. (3.31 to 3.66 g.) of this material. There was 37.2 mgms. of coating per gram of 1,3-dibenzyl-2-streptomycyl-tetrahdroimidazole sulfate. Reconstitution by addition of about 7.22 cc. water gave a final volume of 10 cc. of a suspension containing the equivalent of 200 mgm. streptomycin base/cc.

EXAMPLE 102

A vial was filled with 0.2388 g. 200 mesh 1,3-dibenzyl-2-streptomycyl-tetrahydroimidazole sulfate, 0.0282 g. 60 mesh dextran and reconstituted by the addition of 2.8 cc. water to give a final volume of 3 cc. containing the equivalent of 50 mgm. streptomycin base/cc.

EXAMPLE 103

Streptomycin sulfate (491 g., 0.675 mole) was dissolved with stirring in 1675 ml. water, filtered and the filtrate combined with 200 ml. water used to wash the filter.

N,N'-dibenzylethylenediamine diacetate (487 g., 1.35 moles) was suspended in 1000 ml. of water and neutralized with 50% aqueous sodium hydroxide. After standing, the lower aqueous layer was separated and discarded. The pale yellow, liquid amine was washed with water (500 ml.), separated from the wash water, dissolved in one liter methanol and added to the aqueous solution of streptomycin sulfate with stirring. The mixture was heated 10 minutes at 32°–45° C. and then 20 minutes at 45°–52° C. After cooling to 3° C., the crystalline 1,3-dibenzyl - 2 - streptomycyl - tetrahydroimidazole sulfate which had precipitated was collected by filtration and the filter cake was washed with 1350 ml. chilled methanol and air-dried, weighing 500 g. This product was combined with an additional 200 g. prepared in similar fashion and well mixed. The 1,3-dibenzyl-2-streptomycyl-tetrahydroimidazole sulfate assayed 624, 604, 610 u./mgm. (theory for $C_{37}H_{57}N_9O_{11} \cdot H_2SO_4 \cdot 2H_2O$: 620) and melted about 250°–252° C. (d).

Analysis: Calculated for $C_{37}H_{57}N_9O_{11} \cdot H_2SO_4 \cdot 2H_2O$:

|   | Calculated | Found |
|---|---|---|
| C | 47.3 | 47.2 |
| H | 6.77 | 6.73 |
| S | 3.42 | 3.29; 3.44 |
| H₂O | 3.84 | | loss of water at 80° C. over $P_2O_5$, 3.14; pick-up of water of anhydrous salt, 4.05, 4.15; residue 0.8%.

The pH of a saturated aqueous solution at room temperature of this 1,3-dibenzyl-2-streptomycyl-tetrahydroimidazole sulfate was 8.8.

EXAMPLE 104

N,N'-dibenzylethylenediamine diacetate (1683 g., 4.67 moles) was suspended in 3330 ml. of water and with vigorous mechanical stirring neutralized to pH 10–11 with about 500–525 ml. 50% aqueous sodium hydroxide. The liberated base was separated, washed with 1.5 l. of water, dissolved in 6650 ml. of methanol and this solution was added rapidly to a mechanically stirred, filtered solution of streptomycin sulfate (1637 g.; 2.25 moles; potency 718 u./mgm. by maltol and 651 u./mgm. by bio-assay; 2.5% streptomycin B by activity; 9.3% streptomycin B by weight; 6.55% moisture content) in 5585 ml. of water. After heating to about 50° C. in the course of about 35 minutes, the mixture was cooled to 6° C. and the precipitated 1,3-dibenzyl-2-streptomycyl-tetrahydroimidazole sulfate was collected by filtration, washed with 4.5 l. chilled methanol, air-dried and combined with the product obtained from two other essentially duplicate runs; total weight 4849 g. The average potency of the product was 594 u./mgm. by bio-assay and 599 u./mgm. by maltol. The product melted about 245°–250° C. (browns at 180° C., sinters around 240° C.) The product contained 1.3% streptomycin B by activity and 5% by weight. The product contained 0.31% residue and 3.78% moisture. The pH of a saturated aqueous suspension of the product at room temperature was 8.9. A sample was dried at 80° in vacuo over $P_2O_5$.

Analysis: Calculated for $C_{37}H_{57}N_9O_{11} \cdot H_2SO_4$:

|   | Calculated | Found |
|---|---|---|
| C | 49.27 | 48.7 |
| H | 6.59 | 6.56 |
| S | 3.55 | 3.79 |

CONTROL EXAMPLE 1

An aqueous gel was prepared by making a one percent suspension of methylcellulose in propylene glycol, heating the mixture with stirring to 150° C. and continuing the stirring while allowing the mixture to cool to room temperature.

2.744 g. of 200 mesh streptomycin sulfate was thoroughly mixed q. s. ad 20 cc. into this gel to give a suspension containing the equivalent of 100 mgms. streptomycin base/cc.

CONTROL EXAMPLE 2

2.744 grams of 200 mesh streptomycin sulfate was thoroughly mixed q. s. ad 20 cc. into peanut oil gelled with 2% aluminum monostearate to give a suspension containing the equivalent of 100 mgm. streptomycin base/cc.

CONTROL EXAMPLE 3

343.3 g. of 200 mesh streptomycin sulfate was thoroughly mixed q. s ad 1100 cc. into peanut oil gelled with 2% aluminum monostearate to give a suspension containing the equivalent of 2500 mgm. streptomycin base/11 cc. The suspension was passed twice through a colloid mill and filled into 15 cc. silicone-coated vials so that each contained about 11 cc. of the suspension.

CONTROL EXAMPLE 4

55.8 grams 200 mesh streptomycin sulfate (728 u./mgm.) was made up to 200 cc. with a 0.7% aqueous solution of Tween 40 to give a solution containing the equivalent of 203.5 mgm. streptomycin base/cc.

CONTROL EXAMPLE 5

7.14 grams of finely-divided streptomycin sulfate was thoroughly mixed q. s. ad 50 cc. into peanut oil gelled with 2% aluminum monostearate to give a suspension containing the equivalent of 100 mgms. streptomycin base/cc.

CONTROL EXAMPLE 6

2.14 grams of finely-divided streptomycin sulfate was thoroughly mixed q. s. ad 30 cc. into peanut oil gelled with 2% aluminum monostearate to give a suspension containing the aquivalent of 50 mgm. streptomycin base/cc.

CONTROL EXAMPLE 7

7.14 grams of streptomycin sulfate was dissolved q. s. ad 50 cc. in the above "LST" vehicle to give a solution containing the equivalent of 100 mgm. streptomycin base/cc.

CONTROL EXAMPLE 8

2.14 g. streptomycin sulfate was dissolved q. s. ad 30 cc. in the above "LST" vehicle to give a solution containing the equivalent of 50 mgms. streptomycin base/cc.

CONTROL EXAMPLE 9

Finely-divided streptomycin sulfate was thoroughly mixed into 140 cc. of peanut oil gelled with 2% aluminum monostearate to give a suspension containing the equivalent of 185.3 mgm. streptomycin base/cc.

COMPARISON EXAMPLE NO. 1

The products of Example 100 and Control Example 4 were injected intramuscularly in single doses containing the equivalent of 203 mgm. streptomycin base/kgm. in five mice each three hours before challenge intraperitoneally with 100 $LD_{50}$ doses of *Diplococcus pneumoniae*. All of the mice injected with the product of Example 100 (1,3-dibenzyl-2-streptomycyl-tetrahydroimidazole sulfate in water and Tween 40) survived; none of the mice injected with the product of Control Example 4 (streptomycin sulfate in water and Tween 40) survived. This indicates that the former product exerts repository action and the latter does not.

COMPARISON EXAMPLE NO. 2

The products of Example 92 and Control Example 9 were injected intramuscularly in single doses containing the equivalent of 926 mgm./kg. in groups of five mice each at periods twelve hours, twenty-four hours, and forty-eight hours respectively before challenge intraperitoneally with 100 $LD_{50}$ doses of *Diplococcus pneumoniae*. All the mice injected with the product of Example 92 (1,3-dibenzyl-2-streptomycyl-tetrahydroimidazole sulfate in peanut oil gelled with 2% aluminum monostearate) survived. Two out of each five mice injected with the product of Control Example 9 (streptomycin sulfate in peanut oil gelled with 2% aluminum monostearate) died before challenge due to the toxicity of this drug; either two or three of the remaining three mice in each group failed to survive the challenge. The use of a non-toxic dose of the product of Control Example 9 (185 mgm./kg.) failed to protect more than one out of each group of five mice when given 12 or 24 or 48 hours before challenge. This indicates that the product containing 1,3-dibenzyl-2-streptomycyl-tetrahydroimidazole sulfate is less toxic and exerts far greater repository action than the product containing streptomycin sulfate.

COMPARISON EXAMPLE NO. 3

An experiment similar to that above using a dosage of 1000 mgm./kg. gave the following tabulated results on groups of five mice.

| Number of Example Describing Product Used | Number of Surviving Mice When Challenged at Given Number of Hours After Injection of the Drug | | |
|---|---|---|---|
| | 6 hrs. | 24 hrs. | 48 hrs. |
| Example 85 | 5 | 5 | 4 |
| Example 86 | 5 | 2 (2) | 3 |
| Control Example 2 | 1 (4) | 1 (3) | 1 (1) |

The figures in parentheses represent the number of mice dying before challenge, that is, death known to be due to drug toxicity.

COMPARISON EXAMPLE NO. 4

The products of Examples 88 and 89 and of Control Examples 5 and 6 were injected intramuscularly in single doses (0.2 ml. or 0.1 ml.) containing the equivalent of 250, 500 or 1000 mgm. streptomycin base/kg. into groups of ten mice each at intervals in similar experiments of 1.5, 3, 6, 12, 24, 48 and 72 hours before challenge intraperitoneally with 100 $LD_{50}$ doses of *Diplococcus pneumoniae*. The tables below give the results; X represents an animal dead after infection; ⊗ represents an animal dead before infection (drug toxicity); a blank means all ten mice survived; a large diagonal cross means that the experiment was not run because all or most of the animals would die of drug toxicity at that dose.

*1,3-dibenzyl-2-streptomycyl-tetrahydroimidazole sulfate in peanut oil gelled with 2% aluminum monostearate*

| Dose mgm./kg. | Hours Between Drug and Challenge | | | | | | |
|---|---|---|---|---|---|---|---|
| | 72 | 48 | 24 | 12 | 6 | 3 | 1.5 |
| 1,000 | X | XX | | | | | |
| 500 | XXXXX XXXXX | XXX XXXXX | X | X | | | |
| 250 | XXXXX XXXXX | XXXXX XXXXX | XXXXX | X | | | |

*Streptomycin sulfate in peanut oil gelled with 2% aluminum monostearate*

| Dose, mgm./kg. | Hours Between Drug and Challenge | | | | | | |
|---|---|---|---|---|---|---|---|
| | 72 | 48 | 24 | 12 | 6 | 3 | 1.5 |
| 1,000 | XXXX ⊗XXXX | XXXXX ⊗XXXX | XXXXX | ⊗⊗⊗⊗ | | ⊗ | ⊗⊗ |
| 500 | XXXXX ⊗XXXX | XXXX XXXXX | XXXXX XXXXX | XX XXXXX | | | |
| 250 | XXXX XXXXX | XXXXX XXXXX | XXXXX XXXXX | XXXX XXXXX | XXXXX | XXX | ⊗ |

The superior repository action of the formulations of 1,3-dibenzyl-2-streptomycyl-tetrahydroimidazole sulfate over those of streptomycin sulfate is apparent at all three dosage levels.

COMPARISON EXAMPLE NO. 5

The products of Examples 94 and 95 and of Control Examples 7 and 8 were injected intramuscularly in single doses (0.2 ml. or 0.1 ml.) containing the equivalent of 250, 500 or 1000 mgm. streptomycin base/kg. into groups of ten mice each at intervals in similar experiments of 1.5, 3, 6, 12, and 24 hours before challenge intraperitoneally with 100 $LD_{50}$ doses of *Diplococcus pneumoniae*. The tables below give the results; X represents an animal dead after infection; ⊗ represents an animal dead before infection (drug toxicity); a blank means all ten mice survived; a large diagonal cross means that the experiment was not run because all or most of the animals would die of drug toxicity at that dose.

*1,3-dibenzyl-2-streptomycyl-tetrahydroimidazole sulfate in aqueous lecithin, Span 40 and Tween 40*

| Dose, mgm./kg. | Hours Between Drug and Challenge ||||| 
|---|---|---|---|---|---|
| | 24 | 12 | 6 | 3 | 1.5 |
| 1,000 | ⊗⊗⊗⊗X<br>⊗⊗⊗⊗⊗ | ⊗XXX<br>⊗⊗⊗⊗⊗ | ╳ | ╳ | ╳ |
| 500 | XXXXX<br>⊗⊗⊗XX | XXXXX<br>⊗XXXX | XXXXX | ⊗⊗ | ⊗ |
| 250 | XXXXX<br>XXXXX | XXXXX<br>XXXXX | XXXX<br>XXXX | XX<br>⊗XXXX | |

*Streptomycin sulfate in aqueous lecithin, Span 40 and Tween 40*

| Dose, mgm./kg. | Hours Between Drug and Challenge ||||| 
|---|---|---|---|---|---|
| | 24 | 12 | 6 | 3 | 1.5 |
| 1,000 | ⊗⊗⊗⊗⊗<br>⊗⊗⊗⊗⊗ | ╳ | ╳ | ╳ | ╳ |
| 500 | ⊗⊗⊗⊗⊗<br>⊗⊗⊗⊗⊗ | XXXXX<br>⊗⊗⊗⊗X | ╳ | ╳ | ╳ |
| 250 | XXXXX<br>XXXXX | XXXXX<br>XXXXX | XXXXX<br>XXXXX | XXXX<br>XXXXX | XXXX<br>XXXXX |

The superior repository protective action and the reduced toxicity of the 1,3-dibenzyl-2-streptomycyl-tetrahydroimidazole sulfate formulations compared to those of streptomycin sulfate is apparent at both lower dosage levels.

COMPARISON EXAMPLE NO. 6

The products of Examples 96 and 97 and solutions of streptomycin sulfate in water were injected intramuscularly in single doses (0.2 ml. or 0.1 ml.) containing the equivalent of 250, 500 or 1000 mgm. streptomycin base/kg. into groups of ten mice each at intervals in similar experiments of 1.5, 3, 6, 12, and 24 hours before challenge intra-peritoneally with 100 LD$_{50}$ doses of *Diplococcus pneumoniae*. The tables below give the results; X represents an animal dead after infection; ⊗ represents an animal dead before infection (drug toxicity); a blank means all ten mice survived; a large diagonal cross means that the experiment was not run because all or most of the animals would die of drug toxicity at that dose.

*1,3-dibenzyl-2-streptomycyl-tetrahydroimidazole sulfate in water*

| Dose, mgm./kg. | Hours Between Drug and Challenge ||||| 
|---|---|---|---|---|---|
| | 24 | 12 | 6 | 3 | 1.5 |
| 1,000 | ⊗XXXX<br>⊗⊗⊗⊗⊗ | XXX<br>⊗⊗XXX | ╳ | ╳ | ╳ |
| 500 | XXXXX<br>⊗XXXX | XXXXX<br>XXXXX | XXXXX<br>⊗XXXX | ⊗X | |
| 250 | XXXXX<br>XXXXX | XXXX<br>XXXXX | XXXXX<br>XXXXX | XX | X |

*Streptomycin sulfate in water*

| Dose, mgm./kg. | Hours Between Drug and Challenge ||||| 
|---|---|---|---|---|---|
| | 24 | 12 | 6 | 3 | 1.5 |
| 1,000 | ⊗⊗⊗⊗⊗<br>⊗⊗⊗⊗⊗ | ╳ | ╳ | ╳ | ╳ |
| 500 | ⊗⊗⊗⊗X<br>⊗⊗⊗⊗⊗ | XXX<br>⊗⊗⊗⊗X | ╳ | ╳ | ╳ |
| 250 | XXXXX<br>XXXXX | XXXX<br>XXXXX | XX<br>XXXXX | XXXXX<br>XXXXX | XXXXX<br>XXXXX |

The superior repository protective action and the reduced toxicity in water of 1,3-dibenzyl-2-streptomycyl-tetrahydroimidazole sulfate as compared to streptomycin sulfate is apparent at both lower dosage levels.

This application is a continuation-in-part of my prior co-pending application of Serial Number 338,129, filed February 20, 1953.

I claim:

1. A compound selected from the group consisting of compounds having the formula (a)

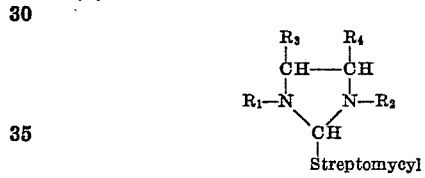

wherein R$_1$ and R$_2$ represent radicals selected from the group consisting of alkyl, cyclopentyl, cyclopentyl-lower alkyl, cyclohexyl, cyclohexyl-lower alkyl, lower alkyl-cyclohexyl-lower alkyl, lower alkoxy-cyclohexyl-lower alkyl, lower alkyl-cyclohexyl, lower alkoxy-cyclohexyl, dehydroabietyl, pyridyl, lower alkyl-pyridyl, thiophene-lower alkyl, lower alkyl-thiophene-lower alkyl, furan-lower alkyl, lower alkyl-furan-lower alkyl, quinolyl-lower alkyl, naphthyl, benzhydryl, piperonyl, thiazolyl, phenyl, lower alkyl-phenyl-lower alkyl, phenyl-lower alkyl, halophenyl-lower alkyl, nitrophenyl-lower alkyl, hydroxyphenyl-lower alkyl, H$_2$N-phenyl-lower alkyl, lower alkoxy-phenyl-lower alkyl, alkoxy-hydroxy-phenyl-lower alkyl, and di-lower alkyl-monohydroxy-phenyl-lower alkyl; R$_3$ and R$_4$ are members selected from the group consisting of hydrogen and methyl; and (b) acid addition salts thereof.

2. Acid addition salts of 1,3-dibenzyl-2-streptomycyl-tetrahydroimidazole.

3. Acid addition salts of 1,3-di(β-phenethyl)-2-streptomycyl-tetrahydroimidazole.

4. Acid addition salts of 1,3-di(dehydroabietyl)-2-streptomycyl-tetrahydroimidazole.

5. Acid addition salts of 1,3-di-(1,1,3,3-tetramethyl-n-butyl)-2-streptomycyl-tetrahydroimidazole.

6. Acid addition salts of 1,3-dicyclohexyl-2-streptomycyl-tetrahydroimidazole.

7. 1,3-dibenzyl-2-streptomycyl-tetrahydroimidazole sulfate.

8. 1,3 - di(β - phenethyl) - 2 - streptomycyl - tetrahydroimidazole sulfate.

9. 1,3 - di(dehydroabietyl) - 2 - streptomycyl - tetrahydroimidazole sulfate.

10. 1,3 - di - (1,1,3,3 - tetramethyl - n - butyl) - 2-streptomycyl-tetrahydroimidazole sulfate.

11. 1,3 - dicyclohexyl - 2 - streptomycyl - tetrahydroimidazole sulfate.

12. A therapeutic composition comprising a liquid suspending medium, a finely-divided solid selected from the group consisting of compounds having the formula (a)

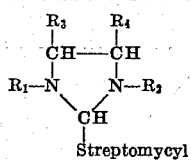

wherein R₁ and R₂ represent radicals selected from the group consisting of alkyl, cyclopentyl, cyclopentyl-lower alkyl, cyclohexyl, cyclohexyl-lower alkyl, lower alkyl-cyclohexyl-lower alkyl, lower alkoxy-cyclohexyl-lower alkyl, lower alkyl-cyclohexyl, lower alkoxy-cyclohexyl, dehydroabietyl, pyridyl, lower alkyl-pyridyl, thiophene-lower alkyl, lower alkyl-thiophene-lower alkyl, furan-lower alkyl, lower alkyl-furan-lower alkyl, quinolyl-lower alkyl, naphthyl, benzhydryl, piperonyl, thiazolyl, phenyl, lower alkyl-phenyl-lower alkyl, phenyl-lower alkyl, halo-phenyl-lower alkyl, nitrophenyl-lower alkyl, hydroxy-phenyl-lower alkyl, H₂N-phenyl-lower alkyl, lower alkoxy-phenyl-lower alkyl, alkoxy-hydroxy-phenyl-lower alkyl, and di-lower alkyl-monohydroxy-phenyl-lower alkyl; R₃ and R₄ are members selected from the group consisting of hydrogen and methyl; and (b) acid addition salts thereof, and a suspending agent for suspending said solid in said liquid medium.

13. A therapeutic composition comprising a liquid suspending medium, a finely-divided, solid, non-toxic acid addition salt of 1,3-dibenzyl-2-streptomycyl-tetrahydroimidazole, and a suspending agent for suspending said solid in said liquid medium.

14. A therapeutic composition comprising a liquid suspending medium, finely-divided solid 1,3-dibenzyl-2-streptomycyl-tetrahydroimidazole sulfate, and a suspending agent for suspending said solid in said liquid medium.

References Cited in the file of this patent
UNITED STATES PATENTS
2,607,770    Winsten _____ Aug. 19, 1952